(12) United States Patent
Vashi et al.

(10) Patent No.: US 7,043,193 B1
(45) Date of Patent: May 9, 2006

(54) VERSATILE RESOURCE COMPUTER-BASED TRAINING SYSTEM

(75) Inventors: Snehal Vashi, Atlanta, GA (US); Rob Waterson, Atlanta, GA (US); Rodney Smith, Atlanta, GA (US); John W. Robinson, Atlanta, GA (US)

(73) Assignee: Knowlagent, Inc., Alpharetta, GA (US)

( * ) Notice: Subject to any disclaimer, the term of this patent is extended or adjusted under 35 U.S.C. 154(b) by 610 days.

(21) Appl. No.: 09/638,771

(22) Filed: Aug. 15, 2000

Related U.S. Application Data

(60) Provisional application No. 60/202,792, filed on May 9, 2000, provisional application No. 60/202,613, filed on May 9, 2000, provisional application No. 60/202,789, filed on May 9, 2000.

(51) Int. Cl.
   *G09B 11/00* (2006.01)
(52) U.S. Cl. ...................... 434/353; 434/323
(58) Field of Classification Search ............... 434/118, 434/156–158, 167, 169, 185, 307 R, 308, 434/309, 318, 322, 323, 350–354, 362, 365, 434/119, 18
   See application file for complete search history.

(56) References Cited

U.S. PATENT DOCUMENTS

| | | | |
|---|---|---|---|
| 3,245,157 A * | 4/1966 | Laviana | .................. 434/307 R |
| 3,594,919 A | 7/1971 | De Bell et al. | |
| 3,705,271 A | 12/1972 | De Bell et al. | |
| 4,684,349 A | 8/1987 | Ferguson et al. | |
| 4,776,016 A | 10/1988 | Hansen | |
| 4,853,952 A | 8/1989 | Jachmann et al. | |
| 4,916,726 A | 4/1990 | Morley et al. | |
| 5,058,008 A | 10/1991 | Schumacher | |
| 5,100,329 A | 3/1992 | Deesen et al. | |
| 5,110,329 A | 5/1992 | Pieper | |
| 5,199,062 A | 3/1993 | Von Meister et al. | |
| 5,228,859 A * | 7/1993 | Rowe | ......................... 434/118 |

(Continued)

FOREIGN PATENT DOCUMENTS

WO    WO 98/22864    5/1998

(Continued)

OTHER PUBLICATIONS

Knowlagent; *Knowlagent r7 Capabilities and Technologies Overview*; Jun. 10, 2004; pp. 1-20.

(Continued)

*Primary Examiner*—Kathleen Mosser
(74) *Attorney, Agent, or Firm*—King & Spalding LLP

(57) ABSTRACT

A computer-based training (CBT) system using versatile resources to support multiple training scenarios in a multi-user environment. The CBT system includes an authoring program module accessible by a lesson designer to create a number of lessons. The CBT system includes one or more runner program modules accessible by lesson takers for running the lessons created with the authoring program module. The CBT system also includes a relational database accessible by the runner program modules and comprises administrative information and information for retrieving desired resources. The versatile resources of the present invention reduce the memory storage requirements for a CBT system capable of supporting multiple training scenarios in a multi-user network environment. The CBT system realistically simulates multi-mode communication systems and implements progressive mentoring and voice-based progression methodologies.

29 Claims, 37 Drawing Sheets

U.S. PATENT DOCUMENTS

| | | | |
|---|---|---|---|
| 5,309,505 A | 5/1994 | Szlam et al. | |
| 5,310,349 A | 5/1994 | Daniels et al. | |
| 5,311,422 A | 5/1994 | Loftin et al. | |
| 5,384,841 A | 1/1995 | Adams et al. | |
| 5,416,694 A | 5/1995 | Parrish et al. | |
| 5,469,491 A | 11/1995 | Morley et al. | |
| 5,511,112 A | 4/1996 | Szlam | |
| 5,513,308 A | 4/1996 | Mori | 395/155 |
| 5,533,115 A | 7/1996 | Hollenbach et al. | |
| 5,535,256 A | 7/1996 | Maloney et al. | |
| 5,583,965 A | 12/1996 | Douma et al. | |
| 5,590,188 A | 12/1996 | Crockett | |
| 5,594,791 A | 1/1997 | Szlam et al. | |
| 5,597,312 A * | 1/1997 | Bloom et al. | 434/362 |
| 5,633,924 A | 5/1997 | Kaish et al. | |
| 5,659,768 A | 8/1997 | Forbes et al. | |
| 5,675,637 A | 10/1997 | Szlam et al. | |
| 5,696,811 A | 12/1997 | Maloney et al. | |
| 5,703,943 A | 12/1997 | Otto | |
| 5,721,770 A | 2/1998 | Kohler | |
| 5,727,950 A | 3/1998 | Cook et al. | |
| 5,738,527 A | 4/1998 | Lundberg | |
| 5,745,109 A | 4/1998 | Nakano et al. | |
| 5,757,644 A | 5/1998 | Jorgensen et al. | |
| 5,790,798 A | 8/1998 | Beckett et al. | |
| 5,818,907 A | 10/1998 | Maloney et al. | |
| 5,825,869 A | 10/1998 | Brooks et al. | |
| 5,827,071 A | 10/1998 | Sorensen et al. | |
| 5,833,468 A | 11/1998 | Guy et al. | |
| 5,861,881 A | 1/1999 | Freeman et al. | |
| 5,877,954 A | 3/1999 | Klimasauskas et al. | |
| 5,903,641 A | 5/1999 | Tonisson | |
| 5,904,485 A | 5/1999 | Siefert | |
| 5,911,134 A | 6/1999 | Castonguay et al. | |
| 5,914,951 A | 6/1999 | Bentley et al. | |
| 5,915,973 A * | 6/1999 | Hoehn-Saric et al. | 434/350 |
| 5,937,037 A | 8/1999 | Kamel et al. | |
| 5,943,416 A | 8/1999 | Gisby | |
| 5,946,375 A | 8/1999 | Pattison et al. | |
| 5,946,387 A | 8/1999 | Miloslavsky | |
| 5,947,747 A * | 9/1999 | Walker et al. | 434/354 |
| 5,957,659 A | 9/1999 | Amou et al. | |
| 5,963,635 A | 10/1999 | Szlam et al. | |
| 5,971,271 A | 10/1999 | Wynn et al. | |
| 5,991,394 A | 11/1999 | Dezonno et al. | |
| 6,014,134 A | 1/2000 | Bell et al. | |
| 6,038,544 A | 3/2000 | Machin et al. | |
| 6,039,575 A | 3/2000 | L'Allier et al. | |
| 6,044,355 A | 3/2000 | Crockett et al. | |
| 6,044,368 A | 3/2000 | Powers | |
| 6,052,460 A | 4/2000 | Fisher et al. | |
| 6,058,163 A | 5/2000 | Pattison et al. | |
| 6,067,537 A | 5/2000 | O'Connor et al. | |
| 6,067,538 A | 5/2000 | Zorba et al. | |
| 6,070,142 A | 5/2000 | McDonough et al. | |
| 6,073,127 A | 6/2000 | Lannert et al. | |
| 6,078,894 A | 6/2000 | Clawson et al. | |
| 6,086,381 A | 7/2000 | Downs et al. | |
| 6,108,687 A * | 8/2000 | Craig | 709/203 |
| 6,118,865 A | 9/2000 | Gisby | |
| 6,118,973 A | 9/2000 | Ho et al. | |
| 6,119,097 A | 9/2000 | Ibarra | |
| 6,128,380 A | 10/2000 | Shaffer et al. | |
| 6,134,539 A | 10/2000 | O'Connor et al. | |
| 6,141,528 A * | 10/2000 | Remschel | 434/350 |
| 6,144,971 A | 11/2000 | Sunderman et al. | |
| 6,146,148 A | 11/2000 | Stuppy | |
| 6,149,441 A * | 11/2000 | Pellegrino et al. | 434/350 |
| 6,155,840 A * | 12/2000 | Sallette | 434/323 |
| 6,163,607 A | 12/2000 | Bogart et al. | |
| 6,170,014 B1 * | 1/2001 | Darago et al. | 709/229 |
| 6,171,109 B1 | 1/2001 | Ohsuga | |
| 6,192,122 B1 | 2/2001 | Flockhart et al. | |
| 6,201,948 B1 | 3/2001 | Cook et al. | |
| 6,211,451 B1 | 4/2001 | Tohgi et al. | |
| 6,215,865 B1 | 4/2001 | McCalmont | |
| 6,263,049 B1 | 7/2001 | Kuhn | |
| 6,275,812 B1 | 8/2001 | Haq et al. | |
| 6,278,978 B1 | 8/2001 | Andre et al. | |
| 6,289,340 B1 | 9/2001 | Puram et al. | |
| 6,301,573 B1 | 10/2001 | McIlwaine et al. | |
| 6,324,282 B1 | 11/2001 | McIlwaine et al. | |
| 6,340,977 B1 | 1/2002 | Lui et al. | 345/709 |
| 6,347,139 B1 | 2/2002 | Fisher et al. | |
| 6,371,765 B1 | 4/2002 | Wall et al. | |
| 6,408,064 B1 | 6/2002 | Fedorov et al. | |
| 6,408,066 B1 | 6/2002 | Andruska et al. | |
| 6,453,038 B1 | 9/2002 | McFarlane et al. | |
| 6,459,787 B1 | 10/2002 | McIlwaine et al. | |
| 6,510,221 B1 | 1/2003 | Fisher et al. | |
| 6,535,600 B1 | 3/2003 | Fisher et al. | |
| 6,553,114 B1 | 4/2003 | Fisher et al. | |
| 6,559,867 B1 * | 5/2003 | Kotick et al. | 345/771 |
| 6,603,854 B1 | 8/2003 | Judkins et al. | |
| 6,628,777 B1 | 9/2003 | McIlwaine et al. | |
| 6,775,377 B1 | 8/2004 | McIlwaine et al. | |
| 2002/0118220 A1 | 8/2002 | Lui et al. | 345/709 |
| 2003/0033184 A1 | 2/2003 | Benbassat et al. | |

FOREIGN PATENT DOCUMENTS

| | | |
|---|---|---|
| WO | WO 2000/68769 | 11/2000 |
| WO | WO 01/065525 A2 | 9/2001 |

OTHER PUBLICATIONS

Knowlagent; Marketing document from website; www.knowlagent.com; (Aug., 2004).

Star Trainer; *Simulation Training for Call Center Agents.* Syntora.com; *Syntora* Agentivity; (2003); 14 Pages.

Deloitte & Touche; *Tech Trends—2002 Annual Report;* (2002); vol. 1; pp. 23-26.

Knoa Software, Inc.; *Achieving Enterprise Application ROI by Managing User Performance;* Mar. 2003; pp. 1-12.

Knoa Software, Inc.; *Driving ROI From On-Demand Services;* Oct., 2003; 6 Pages.

Knoa Software, Inc.; *The knoa Guidance™ Application;* Apr. 2003; pp. 1-12.

*ACTV NET Debuts eSchool Online;* Business Wire; Mar. 24, 1997; pp. 03241287.

Armstrong, *Electronic Mail Order for Distance Learning;* IEEE Colloquium on Commercialising the Internet; pp. 4/1-4/4; Feb. 1997.

Call Center E-Journal; *Telvista Integrates eLearning and Quality Monitoring;* Aug. 2001; pp. 8-12.

Click2learn; *Click2learn Unveils New Platform; Takes Aim at e-Learning Industry's Shortcomings;* Press Release; Jun. 4, 2001.

Click2learn; *Aspen: The Next-Generation e-Learning Platform;* (2001).

Curilem et al.; *Considerations for the Design of a Tutoring System Applied to Diabetes;* Proceedings of the 22$^{nd}$ Annual EMBX International Conference; Jul. 23-28, 2000; pp. 2811-2814.

Cybulski et al.; *Teaching Systems Analysis and Design Using Multimedia and Patterns;* IEEE; 2000; pp. 113-122.

Envision Telephony; *Click2Coach;* (2001).

Envision Telephony; *What Makes Your Contact Center Agents Truly Effective;* (2001).

Fletcher, Scotty; *Companies turn to the Virtual Classroom;* dbusiness.com; May 25, 2000.

Granić et al.; *User Interface Aspects of an Intelligent Tutoring System;* 22nd Int. Conf. Information Technology Interfaces ITI 2000, Jun. 13-16, 2000; pp. 157-164.

Levinson et al.; *Chess Neighborhoods, Function Combination, and Reinforcement Learning;* Institution of Electrical Engineers; 2003; INSPEC Abstract No. C2002-07-7830D-012.

NICE Systems; *NICE to Launch Integrated e-Learning Solution Through Partnership With Astound;* News Release; Dec. 4, 2000.

Skowronek, Larry; *Aspect eWorkforce Management v6;* Jul. 30, 2001.

* cited by examiner

ASSIGN LESSONS
604

THRESHOLD EXAMPLE - 8-BIT SOUND

Lesson being reviewed in Administrator
608

Create author in Administrator

614

Create a new lesson called Test Lesson

618

Set lesson properties
802

Create a task list for a control

812

Insert Audio files in the lesson
908

Capture application
1008

Captured page in StarDesigner

1016

Create Student

1206

Assign lessons
1210

FIG.29

Student login
1306

Assigned lessons to a user

1312

Lesson being run by the student

1318

Ask the student whether he/she wants to log on to Audio Server

1402

| GLOBAL TASKS | EXPLANATION |
|---|---|
| CompleteLesson | Indicate in the student record that the lesson is completed |
| DecrementScore | Decrement the score |
| DisableKeyboard | Disable the keyboard |
| EnableKeyboard | Enable the keyboard |
| Exec | Execute an application |
| IncrementScore | Increment the score |
| ListenAndPlay | Listen to the student(without recording), and once the student is done, play a file |
| MessageBox | Standard Windows messagebox |
| Play | Play a pre-recorded file |
| PlayRecordedWave | Play a student recorded file |
| Quit | Quit the lesson |
| Record | Record student |
| RecordAndPlay | Record student, and once she/he is done, play a file |
| Run | Run an application |
| SkipToNextPage | Show next page in the lesson |
| SkipToPage | Show a page defined by the user |
| SkipToPreviousPage | Show previous page in the lesson |
| StopPlay | Stop playing files |
| StopRecord | Stop recording |
| TimerStart | Start the timer |
| TimerStop | Stop the timer |
| Wait | Wait for user defined seconds |
| WaitForAudioComplete | Wait for all audio events to complete before proceeding further in the script |

FIG. 34

| RESPONSE ITEM TASKS | EXPLANATION |
| --- | --- |
| Concatenate | Append a string to response item |
| Contains (Conditional) | Does the response item contain user defined string regardless of case |
| ContainsExactly (Conditional) | Does the response item contain user defined string including the case |
| Decrement# | Decrement the response item |
| Increment# | Increment the response item |

FIG. 35

| PROPERTIES | | | | PROPERTIES / TASKS / GLOBAL TASKS | | | | | | | | |
|---|---|---|---|---|---|---|---|---|---|---|---|---|
| | Button | CheckBox | ComboBox | EditBox | GroupBox | HotSpot | Image | Label | ListBox | Page | RadioButton | Tab | Video |
| AcceptsChars | | | | X | | | | | | | | | |
| AnimationName | | | | | | | | | | | | | X |
| AutoPlay | | | | | | | | | | | | | X |
| AutoHScroll | | | | X | | | | | | | | | |
| AutoVScroll | | | | X | | | | | | | | | |
| BackGround | | | | | | | | | | X | | | |
| BackGroundColor | X | X | X | X | X | | | X | X | | X | | |
| Border | | | | | | | | X | | | | | |
| BorderStyle | | | | | | | | | | X | | | |
| Caption | X | X | X | X | X | | | X | | X | X | X | |
| CenterVertically | | | | | | | | X | | | | | |
| ChangeCursor | | | | | | X | X | | | | | | |
| Check | | X | | | | | | | | | X | | |
| ComboBoxStyle | | | X | | | | | | | | | | |
| Enabled | X | X | X | X | X | X | X | X | X | X | X | X | |
| Font | X | X | X | X | X | | | X | X | X | X | X | |
| Height | X | X | X | X | X | X | X | X | X | X | X | X | X |
| HorizAlign | X | X | | | X | | | | | | X | | |
| Image | | | | | | | X | | | | | | |
| Left | X | X | X | X | X | X | X | X | X | X | X | X | X |
| MultiLine | | | | X | | | | | | | | | |
| Number | | | | X | | | | | | | | | |
| SelectionType | | | | | | | | | X | | | | |
| SizeToImage | | | | | | | X | | | | | | X |
| Sort | | | X | | | | | | X | | | | |
| TabStop | X | X | X | X | X | | | | X | | | | |
| TabStyle | | | | | | | | | | | | X | |
| TextColor | X | X | X | X | X | | | X | X | | X | | |
| TextPosition | | | | | | | | X | | | | | |
| Top | X | | X | | X | X | X | X | X | X | X | X | X |
| TriState | | X | | | | | | | | | | | |
| Transparent | | | | | | | | | | | | | X |
| VertAlign | X | | | | | | | | | | | | |
| VertScroll | | | | X | | | | | | | | | |
| Visible | X | X | X | X | X | | X | X | X | X | X | X | X |
| Width | X | X | X | X | X | X | X | X | X | X | X | X | X |

FIG. 36

| TASKS (** indicates a Conditional-only task) | Button | CheckBox | ComboBox | EditBox | GroupBox | HotSpot | Image | Label | ListBox | Page | RadioButton | Tab | Video |
|---|---|---|---|---|---|---|---|---|---|---|---|---|---|
| EVENTS | Click | Click | Init/SC/GF/LF | GF/LF/TC | Click | C/DC | C/DC | | Init/SC/D C/GF/LF | Init/C/Exit | Click | Init / SC | |
| AcceptsChars | | | | X | | | | | | | | | |
| AddString | | | X | | | | | | X | | | | |
| AddStrings | | | X | | | | | | X | | | | |
| AddTab | | | | | | | | | | | | X | |
| AnimationName | | | | | | | | | | | | | X |
| AutoPlay | | | | | | | | | | | | | X |
| BackGround | | | | | | | | | | X | | | |
| BackGroundColor | X | X | X | X | X | | | X | X | X | X | | |
| Border | | | | | | | | X | | | | | |
| Caption | X | X | X | X | X | | | X | | X | X | | |
| ChangeCursor | | | | | | X | X | | | | | | |
| Check | | X | | | | | | | | | X | | |
| Clear | | | X | | | | | | X | | | | |
| ClearImage | | | | | | | X | | | | | | |
| Close | | | | | | | | | | | | | X |
| **Count | | | Conditional | | | | | | Conditional | | | | |
| DeleteString | | | X | | | | | | X | | | | |
| DeleteTab | | | | | | | | | | | | X | |
| Enabled | X | X | X | X | X | X | X | X | X | | X | X | |
| Font | X | X | X | X | X | | | X | X | | X | X | |
| Height | X | X | X | X | X | X | X | X | X | X | X | X | X |
| HorizAlign | X | X | | | X | | | | | | X | | |
| HorizScroll | | | | X | | | | | | | | | |
| Image | | | | | | | X | | | | | | |
| InsertString | | | X | | | | | | X | | | | |
| Left | X | X | X | X | X | X | X | X | X | X | X | X | X |
| **LineCount | | | | Conditional | | | | | | | | | |
| Move | X | X | X | X | X | X | X | X | X | X | X | X | X |
| Number | | | | X | | | | | | | | | |
| Open | | | | | | | | | | | | | X |
| Play | | | | | | | | | | | | | X |
| ResetContent | | | | | | | | | | | | | |
| **SelectedIndex | | | Conditional | | | | | | Conditional | | | | |
| **SelectedText | | | Conditional | | | | | | Conditional | | | | |
| SelectTab | | | | | | | | | | | | X | |
| SetFocus | X | X | X | X | | | | | X | | X | X | |
| SetSelection | | | X | | | | | | X | | | | |

FIG. 37

| TASKS (** indicates a Conditional-only task) | Button | CheckBox | ComboBox | EditBox | GroupBox | HotSpot | Image | Label | ListBox | Page | RadioButton | Tab | Video |
|---|---|---|---|---|---|---|---|---|---|---|---|---|---|
| ShowDropdown | | | X | | | | | | | | | | |
| SizeToImage | | | | | | | X | | | | | | |
| SizeToText | X | X | | | X | | | | | | X | | |
| Stop | | | | | | | | | | | | | X |
| TabControl | | | | | | | | | | | | | |
| Text | | | | X | | | | | | | | | |
| TextColor | X | X | X | X | X | | | X | X | | X | | |
| TabStyle | | | | | | | | | | | | X | |
| Top | X | X | X | X | X | X | X | | X | X | X | X | X |
| TypeText | | | X | X | | | | | | X | | | |
| VertAlign | X | | | | | | | | | | | | |
| VertScroll | | | | X | | | | | | | | | |
| Visible | X | X | X | X | X | | X | X | X | | X | X | X |
| Width | X | X | X | X | X | X | X | X | X | X | X | X | X |
| SC=SelectionChanged | | | | | | | | | | | | | |
| GF = GotFocus | | | | | | | | | | | | | |
| LF = LostFocus | | | | | | | | | | | | | |
| C = Click | | | | | | | | | | | | | |

FIG. 38

VERSATILE RESOURCE COMPUTER-BASED TRAINING SYSTEM

REFERENCE TO RELATED APPLICATIONS

This application claims priority to commonly-owned U.S. Provisional Application Nos. 60/202,792, 60/202,613, and 60/202/789, each filed on May 9, 2000.

TECHNICAL FIELD

This invention relates generally to the field of computer-based training systems and, more particularly, to a computer-based training system in which a single stored copy of a versatile resource, such as a display page, bit map, audio file, or video file may be used to create instances of the resource "on the fly" for use in connection with multiple training lessons.

BACKGROUND OF THE INVENTION

Computer-based training (CBT) is an important aspect of employee and student training and evaluation for many types of applications. For example, CBT system is known to be a particularly effective method for training call center operators. Many other tasks can similarly benefit from CBT system, such as from foreign language training, flight simulation, computer diagnostics, medical procedures, parcel handling, automotive repair, and many others. For all of these applications, the aim of the CBT system is to simulate the task environment using the computer, and in some cases other types of equipment, to play or display a training session to a student user. This allows the student user experience the task environment in a training mode before actual exposure to the task. Generally, more realistic CBT system simulations are more effective training devices.

Although many types of CBT systems have been developed, these conventional CBT systems typically suffer from a number of drawbacks. For example, complicated tasks such as call center operations or flight simulation involve an extremely large number of simultaneous actions and task scenarios that could occur in actual operations. Creating a separate training scenario for each and every actual scenario that might occur might be prohibitively expensive in terms of programming time, computer memory, or other scarce resources. Moreover, configuring the CBT system to jump from one stored scenario to another in responses to decisions or choices that occur during the course of a simulation greatly increases the complexity of the system. As a result, only the most expensive CBT system applications, such as flight simulation, justify the cost required to implement a significant number of alternative scenario paths.

In addition, conventional CBT systems typically rely on recorded video displays to simulate a task environment. In this type of CBT system, a different video recording may be required for each stored scenario. For a simulation system of even moderate complexity, this requires a very large amount of computer-readable storage to house the various scenarios. Because the task environment is basically the same but only differing in details or settings for different scenarios, much of the stored video turns out to be largely duplicative. This data storage problem inherently multiplies itself in a multi-simulation setting in which multiple training workstations may each require separate continuous video service. A similar multiplication of data storage requirements occurs when student training sessions are saved for subsequent play back and evaluation.

Many conventional CBT systems also lack the ability to realistically simulate multi-mode simulations in which multiple modes of communication are simultaneously used in the task. For example, telephone call center operations typically require use of an audio mode of communication via a telephone simultaneously with use of a graphical display mode of communication via a computer system. There is no functionality present in most conventional CBT systems to realistically simulate the simultaneous use of both modes of communication in a training environment.

Thus, there is a need in the art for a method and system for improved CBT systems. In particular, there is a need for reducing the memory storage requirements for a CBT system capable of supporting multiple training scenarios in a multi-user network environment. There is a further need for a CBT system that realistically simulates multi-mode communication systems. Additional improvements in CBT system technology are also needed.

SUMMARY OF THE INVENTION

The present invention meets the needs described above in a computer-based training (CBT) system using versatile resources to support multiple training scenarios in a multi-user network environment. The resources are referred to as "versatile" because they are separately stored in memory and independently retrievable for display or play in association with multiple lessons. For example, versatile resources typically include lesson pages and separately stored data files that can be displayed or played in association with lessons or lesson pages, such as sound files, video files, and bit maps.

Generally described, the invention is a computer-based training (CBT) system including an authoring program module that is accessible by a lesson designer to create a number of lessons. Each lesson includes one or more links to versatile resources for display or play in association with the lesson. The CBT system also includes one or more runner program modules that are accessible by lesson takers for running the lessons created with the authoring program module. The CBT system also includes a relational database that is accessible by the runner program modules. The relational database contains administrative information along with information for retrieving desired resources for display or play in association the lessons. That is, as a runner program module runs a lesson, it accesses that relational database "on the fly" to determine information that allows the runner program module to retrieve the resources to be played or displayed as part of the lesson.

Each lesson typically includes a plurality pages, and each page typically includes one or more controls defining visual and functional aspects of the page, links to resources, and script instructions defining lesson logic for implementing the page. To create lessons, the authoring program module includes a predefined set of menu-driven commands that the lesson designer selectively activates to create the pages, add the controls to the pages, link the pages to the resources, and create the script instructions for rendering pages and implementing lesson logic. For example, the menu-driven commands may allow a lesson designer to add standard Windows-supported controls to a lesson page, such as radio buttons, check boxes, combo boxes, and so forth. The resources that may be linked to a lesson page typically include bit maps, video files, and audio files.

As noted above, the resources are separately stored in memory so that they may be independently retrieved for display or play in association with multiple lessons. In a similar manner, the lessons and pages are also separately stored in memory so that they may be independently retrieved for display or play in association with multiple lessons. In other words, each lesson and each page is stored as a separate resource, which allows the lessons and pages themselves to be independently retrieved for display or play in association with multiple lessons. In addition, student responses to a lesson may be recorded and stored as resource so that the lesson, along with the student's responses, can be subsequently played back for evaluation.

To facilitate the retrieval of resources from memory "on the fly," the resources are subdivided into a plurality of resource types, with each resource type including one or more similar resources. For example, audio files may be a first resource type, video files may be a second resource type, bit maps may be a third resource type, pages may be a fourth resource type, and so forth. Each resource is assigned a resource name, and each resource type is assigned a resource type name. The resource name and resource type name assigned to a particular resource defines a root path for retrieving that resource from memory. Thus, the resource name and resource type name for each resource may be retrieved from the relational database and appended together to create the root path for retrieving that resource from memory.

The authoring program module also includes a capture feature for importing screen objects from foreign program modules into a lesson. The capture feature interrogates a target screen object to identify screen object controls that are supported by the authoring program module. The capture feature then renders each screen object control within a lesson page to recreate the functional and visual aspects of the screen object control. The capture feature also extracts one or more screen object bit maps from the screen object corresponding to visual aspects of the screen object that do not correspond to screen object controls that are supported by the authoring program module. The capture feature then stores the extracted bit maps as resources indexed by the relational database, and creates script instructions within the page for combining the screen object controls with the screen object bit maps to recreate the functional and visual aspects of the screen object when running the lesson.

The invention may also be used to implement multi-mode training session, such as those utilizing a computer as a first communication mode and a telephone as a second communication mode. In this case, the resources include first and second resource types for play or display in association with the first and second communication modes, respectively. In addition, the implementation of the lesson logic by the runner program module synchronizes the play or display of the first and second resource types to create an integrated multi-mode lesson. For example, a graphical display on a computer may be synchronized with audio played over a telephone to simulate a work environment of a call center.

To facilitate network-based operation of the CBT system, the runner program module resides in a shared folder maintained on a network server. This allows multiple instances of the runner program module to be downloaded from the network server to the student workstations upon command. Each downloaded instance of the runner program module then runs within a memory space maintained on the student workstation, and deletes from the student workstation memory space upon completion of the session. Advantageously, this shared folder functionality is a generally available operating system feature that allows each student workstation to download its associated instance of the runner program module without having software specific to the runner program module previously installed on the runner workstation. This allows new student workstations to be added to the CBT system network without having to pre-install any CBT system software modules on the student workstations.

It will also be appreciated that the configuration descried above allows the session running on each student workstation to operate independently of the other sessions running on the other student workstation. Thus, each student workstation may run the same or different lessons, and each user lesson may proceed at a different rate and take a different path through the lesson logic. In addition, multiple instances of any given lesson may be simultaneously deployed on multiple student workstations as desired, but only a single copy of the lesson remains permanently stored on the lesson server.

To allow the CBT system to function as a testing and evaluation platform, an evaluation score may be computed based on the user's response to prompts played or displayed as part of a lesson. In addition, the lesson and the associated user responses may be stored for subsequent playback and evaluation. This type of evaluation, which shows the student user's keystrokes and other responses to specific commands in real time, can be a more effective evaluation mechanism than other evaluation techniques typically used in CBT systems, such as knowledge-based testing techniques.

The CBT system is also equipped to implement realistic multi-modal training lessons, such as training lessons designed for call center operators who use computer-based utilities to response to customer transactions received over the telephone. For this type of training lesson, a student user typically provides audible responses to prompts played or displayed as part of a lesson. To implement the lesson in a realistic manner, the CBT system is configured to progress the lesson logic in response to detection of an audible response and a predetermined period of silence following the audible response. That is, once the CBT system prompts the user for an audible response, it waits to detect an audible response followed by a predetermined period of silence before progressing the lesson to the next task.

The CBT system is also equipped to implement training through a technique known as "progressive mentoring." For this training method, a lesson is divided into a plurality of skill-related task types, such as typing and speaking. Each task type is configured to selectively run in a demonstration mode in which user responses are not required to prompts relating to that task type, or in a training mode in which user responses are required to prompts relating to that task type. This allows the user to observe the lesson with all types of tasks in the demonstration mode, and then to practice the lesson with one type of task in the training mode while the other task is in the demonstration mode. Once the student becomes confident at these levels of mentoring, the student can "go solo" with all types of types of tasks operating in the training mode.

In a specific embodiment, the CBT system includes a computer network defining a number of network ports for connecting servers and workstations to the network. A lesson server functionally connected to a network port stores a group of lessons that each include a synchronized set of audio and interactive graphical display resources. The CBT system also includes a number of student workstations that are each connected to a network port and configured to display the graphical display resources of a selected lesson and to receive interactive student responses to these resources. The CBT system also includes an audio server that is connected to a network port and includes a number of audio ports for connecting the audio server to an equal number of telephone lines. The audio server is configured to play the audio resources of the selected lesson in synchronism with the display of the associated graphical display resources. The CBT system also includes a group of telephone extensions. Each telephone extension is typically associated with and located near a student workstation to allow the student workstation and the associated telephone extension to be accessed simultaneously by a student user.

The CBT system also includes a private branch exchange (PBX) that is functionally connected to the audio server by way of a trunk of telephone lines, with each line of the trunk connected to an associated audio port on the audio server. The PBX is configured to selectively assign available lines of the trunk to the telephone extensions to connect the telephone extensions to the audio server. That is, upon receipt of a telephone call the PBX connects an available trunk line to the incoming telephone extension line, which connects a particular audio port of the audio server to the telephone extension. After obtaining a unique identification number from the lesson server, the audio server then delivers that audible identification number to the student user on the telephone extension. Upon entry of the identification into the student workstation, the CBT extension. This correlates the student's workstation with the student's telephone extension to synchronize these two communication modes during the ensuing training session.

That the invention improves over the drawbacks of prior CBT systems and accomplishes the advantages described above will become apparent from the following detailed description of the embodiments of the invention and the appended drawings and claims.

BRIEF DESCRIPTION OF THE DRAWINGS

FIG. 29 is an illustration of a CBT system user interface for assigning a lesson to a student.

FIG. 34 is a table describing global tasks for creating lesson logic in CBT system.

FIG. 35 is a table describing response tasks for creating lesson logic in a CBT system.

FIG. 36 is a table describing properties available for specific controls in a CBT system.

FIG. 37 is a continuation of the table of FIG. 36.

FIG. 38 is a continuation of the table of FIGS. 36–37.

DETAILED DESCRIPTION OF EXEMPLARY EMBODIMENTS

Figure 1:
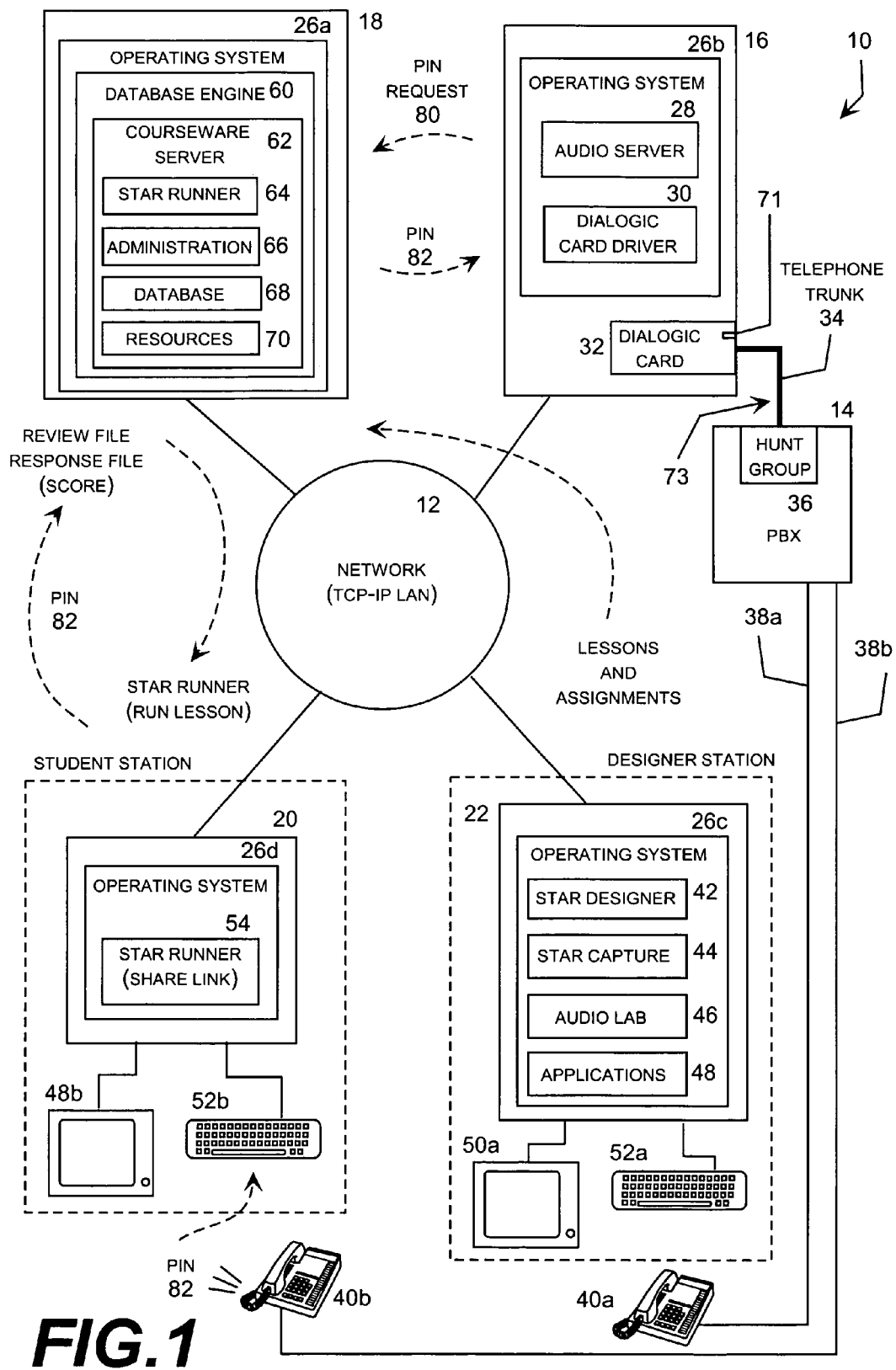
FIG. 1 is a functional block diagram of a network-based computer-based training (CBT) system using versatile resources.

The present invention may be embodied in a network-based computer-based training (CBT) system configured to perform training simulations using versatile resources. For example, the CBT system presently sold under the name "StarTrainer" embodies many aspects of the invention as described in this specification. The resources used by Star-Trainer are referred to as "versatile" resources because they are separately stored in memory and independently retrievable for display or play in association with multiple lessons. These versatile resources typically include lesson pages and separately stored data files that can be displayed or played in association with lessons or lesson pages, such as sound files, video files, and bit maps.

There are three main components of the StarTrainer CBT system: an audio server, which manages the voice portion of simulation; a courseware server, which manages the application portion of simulation; and authoring tools, which allow the creation of training courses that synchronize voice and data according to specific training objectives. The courseware server includes an application program known as "Starkunner" for running previously-authored simulations; an administration utility for creating authors, creating students, assigning lessons to students, and so forth; a relational database for storing administrative and operational information including resource names and paths for retrieving versatile resources from memory; and a stored set of versatile resources. The authoring tools include an application program known as "StarDesigner" for creating lessons, a "StarCapture" utility for importing screen displays from other application programs into lessons, and other application program called "AudioLab" for creating sound recordings.

The audio server is typically deployed within a standard personal computer (PC) with specialized telephony cards that connect it to a private branch exchange (PBX) system. All that's required of the PBX is a "hunt group" appropriate for the number of simultaneous calls that the client would like StarTrainer to support, which can typically be up to 24 lines for each telephony card installed in the audio server. The PBX connects a telephone call to an available line selected from the hunt group when the PBX receives a telephone call directed to a "pilot number" assigned to the hunt group. That is, the PBX "hunts" through the group of lines assigned to the hunt group for an available line whenever it receives a telephone call to the pilot number for the hunt group. The audio server's functions include recording speech for course content, receiving calls for inbound and outbound simulation, delivering speech throughout the simulation, and recording agent responses for later review. Of course, telephones operate both in wired networks and in wireless networks.

For convenience, the CBT system is described in this specification in the context of a wired telephone network. Nevertheless, the term "line" in the telephone context should be interpreted broadly to include a "virtual line," such as a wireless communication channel, as well as a wired telephone connection. The selection of a wired or wireless telephone network is a design choice familiar to those skilled in the telephone art, who will understand how to deploy the present invention in a wireless telephone environment without undue experimentation.

The courseware server, which delivers the visual portion of each simulation, also typically runs on a standard PC. The courseware server is configured to interconnect with other computers on the network, typically a LAN, where the courseware server appears as an IP address. The network allows the courseware server to communicate with the audio server to synchronize data provided by the courseware server via a student workstation on the network with voice data provided by the audio server via a telephone extension connected through the PBX. During each training session, the courseware server delivers screens that simulate the actual work environment, including host applications and scripts, and records trainee responses for playback.

Virtually all of the current CBT system technologies available today employ PC sound card and speaker to play sound files, and in some rare cases to record sound files. Unlike these conventional training methodologies, the StarTainer CBT system simulates the genuine multi-mode experience of using a PC application and talking to a customer over the telephone at the same time. What the student sees and hears is, for all practical purposes, no different from a real call, including the instruments used to communicate.

To use the StarTainer CBT system, training sessions may be activated by individual students on demand from any PC workstation on the network. There is no requirement to install or register software on the workstation, nor is a sound card or CD ROM drive necessary. After the student launches the server-based StarRunner application from a workstation on the network, the system instructs the student to dial an extension number using any telephone connected to the user's PBX. As the student conducts training sessions using lessons stored on the courseware server, the system synchronizes simulated transactional data presented on the PC workstation with simulated voice conversation played over the telephone connection. This allows students to experience voice interactive training without installing a sound card or speakers on their systems. That is, in lieu of speakers, existing telephone and PBX is used to deliver voice files to the student, and to record student responses.

A typical process for synchronizing the audio server with the courseware server typically proceeds as follows. First, a student user launches the StarRunner server-based application from a student workstation by double-clicking on an icon in a shared network folder. This shared-folder icon corresponds to the copy of the StarRunner application residing in the courseware server. The launch command causes an instance of the StarRunner application to be downloaded to the student workstation, where it loads into the system memory and becomes active. A screen display then asks the student to dial a pre-defined number on a nearby telephone extension; namely, the pilot number for the hunt group in the PBX assigned to the audio server. The screen display may give this number to the student, or the student may be expected to know this number from a previous orientation session. In either case, the student then dials the pilot number on the telephone extension.

Upon receiving the telephone call, the PBX connects the student's telephone extension with the audio server by finding an available line within the hunt group and connecting that line with the incoming telephone line from the student's telephone extension. The audio server then receives the telephone call on a particular audio port having an assigned port number; namely, the port connected to the telephone line selected by the PBX to connect the audio server with the student's telephone extension.

Upon receiving the telephone call, the audio server contacts courseware server and delivers a message to the courseware server. This message, which includes the audio port number for the subject training session, requests the courseware server to issue an identification or PIN for the training session. The courseware server either randomly generates or looks up an available PIN from a predefined memory location, and delivers the PIN to the audio server. The courseware server also stores the PIN and the audio port number for the training session in a table for later use. The audio server then employs pre-recorded audio files to play the PIN on the student's telephone extension along with a recording asking the student to enter the PIN into a pre-defined edit field within a dialog box displayed on the student's workstation.

The student then enters the PIN in the dialog box along with an "OK" command, which delivers the PIN to the courseware server. The courseware server then uses the PIN to correlate the network address for the student's workstation with the audio port in the audio server that is connected to the student's telephone extension. Specifically, the courseware server enters the network address for the student's workstation into the reference table, completing a record for the training session that includes the PIN, the audio server port number for the training session, and the network address for the student's workstation. During the course of the training session, the courseware server references this record to route audio files for the training session to the correct audio server port, which causes the audio server to play these audio files on student's telephone extension phone. The StarRunner application software then presents the student with a list of available lessons, and the training session begins. To conclude the training session, the student simply hangs up the telephone extension, or closed the StarRunner application.

The StarTrainer system also employs voice interactivity, which is also referred to as voice-based progression, in training sessions. Conventional CBT system usually require the user to perform some sort of kinetic action to progress in the lesson, such as pressing a key of the keyboard or mouse-clicking on a button on the screen. The StarTrainer CBT system, on the other hand, employs silence detection to detect when a student has started speaking and when the student has stopped speaking. This voice management technology may be use when a student uses a separate telephone connected to the CBT network through a PBX, and when a student uses a standard sound card and speakers/microphone connected to the student's workstation. In either case, voice-based progression provides a more realistic training experience.

In addition, many business processes involve an individual performing multiple tasks at the same time to accomplish a particular goal. For example, a technical support person on the phone typically has to carry on a telephone conversation, look up data on a computer workstation, and enter some new data into the workstation more or less simultaneously. It can be difficult and time consuming to train an employee to use all of these skills simultaneously with traditional linear training methods.

Progressive mentoring is a methodology implemented by the StarTrainer CBT system that exposes the student to the skills of the business process one skill at a time to build the knowledge and skills incrementally. The goal of progressive mentoring is to quickly teach the student to listen, think, talk and type all at the same time without overwhelming the student's sensory system all at once. In the first training mode, the student typically observes the system plays the role of the expert mentor. In this mode, the student watches keyboard and mouse activity taking place on the PC and listens to the conversation between the expert and the customer. In the second training mode, the student talks with the customer while the system continues to handle the keyboard and mouse activity. Then, in the third training mode, the responsibilities swap and the student works the keyboard and mouse to interact with the application program, while the system does the speaking. Finally, the student goes "solo" for the full experience of handling both the voice communication and the computer interaction at the same time. Of course the student has the opportunity to repeat any mode of simulation in the lesson to hone specific skills. Various levels of help are also available to the student if they get stuck or have questions regarding the best way to proceed in a particular circumstance. The degree of help can be controlled from within the lesson script. Although progressive mentoring is described above in the context of a call center training system, it could be employed in virtually any type of multi-modal communication system.

Generally defined, progressive mentoring breaks a multi-modal task into "n" steps. The system then allows the student to monitor all "n" steps being performed by the system as a tutorial, with the ability to stop, start and replay the lesson as often as they wish. The student can then start performing the tasks for any one or any combination of the "n" tasks, while the system performs the remainder. As before, the student can stop, start and replay any combination of tasks as often as they wish. By the end of the session, the student is performing all "n" tasks and the system records all of the student input for later playback and review. Additionally, the system scores the student based upon a comparative of best practices setup by the lesson designer. The student's input as well as scores can used for self-evaluation as well as stored for later comparatives.

To create a progressive mentoring lesson, the lesson designer breaks a defined task into its distinct parts. In most cases in which this system is used, it will consist of a minimum of two separate communication modes, such as talking on the telephone with another individual, and typing or mouse commands to interact with a computer program. While more esoteric functions such as listening and thinking are by necessity required, they are normally not broken into separate distinct functions.

The authoring process typically proceeds as follows. First, the lesson designer authors a "best practices" scenario to simulate proper performance of the task. For example, a call from a customer that covers one of the most frequently asked questions. The lesson designer then creates create the customer dialog to simulate the selected scenario. Next, the lesson designer creates the student dialog exhibiting corporate best practices. Typically, separate individuals record the dialog for each of the roles in the selected scenario. The designer then captures screens from the software the student would utilize when performing these tasks. Using StarDesigner, the lesson designer creates the "n" steps outlined above, first creating the entire scenario with both sides of the dialog as well as all computer interaction. The designer then repeats the process for each training mode.

Turning now to the figures, in which like numerals refer to like elements throughout the several figures, FIG. 1 is a functional block diagram of an illustrated embodiment of the invention, a network-based CBT system 10 using versatile resources. The CBT system 10 may be installed on any type of computer network, such as a LAN, WAN, Ethernet, the Internet, and so forth. In the illustrated embodiment, which is intended for telephone call center simulations, the CBT system 10 operates on a typical office-environment TCP-IP LAN 12 that works in connection with the office's telephone PBX 14. The LAN 12 includes a number of network ports that are used to interconnect a audio server workstation 16, a courseware server workstation 18, one or more student workstations 20, and one or more designer workstations 22. Of course, one or more of the audio server workstation 16, the courseware server workstation 18, the student workstation 20 and/or the designer workstation 22 could be combined into one workstation. Each workstation typically runs a common operating system, such as WINDOWS NT, as represented by the operating systems 26a–d.

In the illustrated embodiment, the audio server workstation 16 and the courseware server workstation 18 may be PC workstations running at least Pentium 300 MHz processors with 128 MB RAM, 8 GB hard drive, and CD ROM drive running WINDOWS NT Server 4.0 or higher operating system software with at least Service Pack 5. The student workstations 20 and the designer workstations 22 may be PC workstations running at least Pentium 133 MHz processors with 32 MB RAM and a 800×600 video display running WINDOWS 95 OSR2, WINDOWS 98, or WINDOWS NT Workstation 4.0 or higher operating system software with Service Pack 5. The network 12 should provide 10 Mbps or faster Ethernet links and TCP/IP protocol allowing both static and dynamic network addressing. Although the CBT system 10 is described in the contest of the WINDOWS operating system environment, those skilled in the art will appreciate that the subject invention could alternatively be embodied in computer systems utilizing other types of operating systems.

The audio server workstation 16 preferably includes audio server software 28, a DIALOGIC card driver 30, and one or more DIALOGIC telephone card 32. Of course, other types of telephone cards and drivers may be used. The telephone card 32 includes a number of audio ports for connection to telephone lines. For example, a U.S. standard card typically includes 24 audio ports for connection to a standard 24-line T1 telephone trunk. Alternatively, a European standard card typically includes 30 audio ports for connection to a standard 30-line E1 telephone trunk. Multiple telephone cards 32 may be used to increase the number of simultaneous users supported by the CBT system 10. The audio ports of each telephone card 32 are connected to the PBX 14 by way of a telephone trunk 34, such as a T1 or E1 telephone trunk. Alternatively, the CBT system 10 may use one or more DIALOGIC analog cards and analog trunk lines. The PBX 14 is configured with a hunt group 36 that corresponds to the lines of the telephone trunk 34. The PBX 14 connects an incoming telephone call to an available line within the trunk 34 selected from the hunt group 36 whenever the PBX 14 receives a telephone call directed to a "pilot number" assigned to the hunt group 36. That is, the PBX 14 "hunts" through the lines of the trunk 34 for an available line within the whenever it receives a telephone call to the pilot number for the hunt group 36.

The designer workstation 22 includes authoring tool that a lesson designer uses to create lessons. These authoring tools include an application program 42 known as "StarDesigner" for creating lessons, a "StarCapture" utility 44 for importing screen displays from other application programs 48 into lessons, and the AudioLab application program 46 for creating sound recordings. The designer workstation 22 also includes a monitor 50*a* and a keyboard/mouse input device 52*a*. The StarDesigner, StarCapture, and AudioLab modules 42, 44, and 46 are menu-driven design tools that utilize the programmer's tool kit supported by the WINDOWS operating environment. For example, a lesson designer can create lessons pages by adding standard WINDOWS controls, such as radio buttons, check boxes, combo boxes, and so forth. The lesson designer can then define the standard properties that define the appearance of these controls. The lesson designer can also link resources to lesson page, such as bit maps, video files, and audio files. The lesson designer can also specify lesson logic for implementing the lesson pages, which StarDesigner stores as Visual Basic script instructions. Of course, other scripting languages could also be used in alternative implementations.

The student workstation 20 includes a monitor 50*b* and a keyboard/mouse input device 52*b* and sufficient internal memory to allow an instantiation of the StarRunner application 54 to be loaded into and run on the student workstation 20. No specialized software or hardware needs to be installed on the student workstation 20. Instead, a permanent copy of the StarRunner application 64 resides in a shared folder maintained on the courseware server workstation 18. This allows multiple instances of the StarRunner application 64 to be downloaded from the courseware server workstation 18 to the student workstations 20 upon command. Each downloaded instance 54 of the StarRunner application then runs within a memory space maintained on the student workstation 20, and deletes from the student workstation memory space upon completion of the session. This shared folder functionality is a generally available feature of the WINDOWS operating system 26, which allows each student workstation to download its associated instance of the StarRunner application without having software specific to the StarRunner application previously installed on the student workstation 20. This allows new student workstations to be added to the network 12 without having to pre-install any CBT system software modules on the workstations.

The courseware server workstation 18 includes a database engine 60, such as SYBASE SQL ANYWHERE database engine. Of course, another type of database engine could be used. The courseware server software 62 is then installed on the database engine 60. The courseware server software 62 includes the StarRunner application 64 for running previously-authored simulations, an administration utility 66 for creating authors, creating students, assigning lessons to students, and so forth; a relational database 68 for storing administrative and operational information including resource names and paths for retrieving versatile resources from memory; and a stored set of versatile resources 70.

Figure 2:
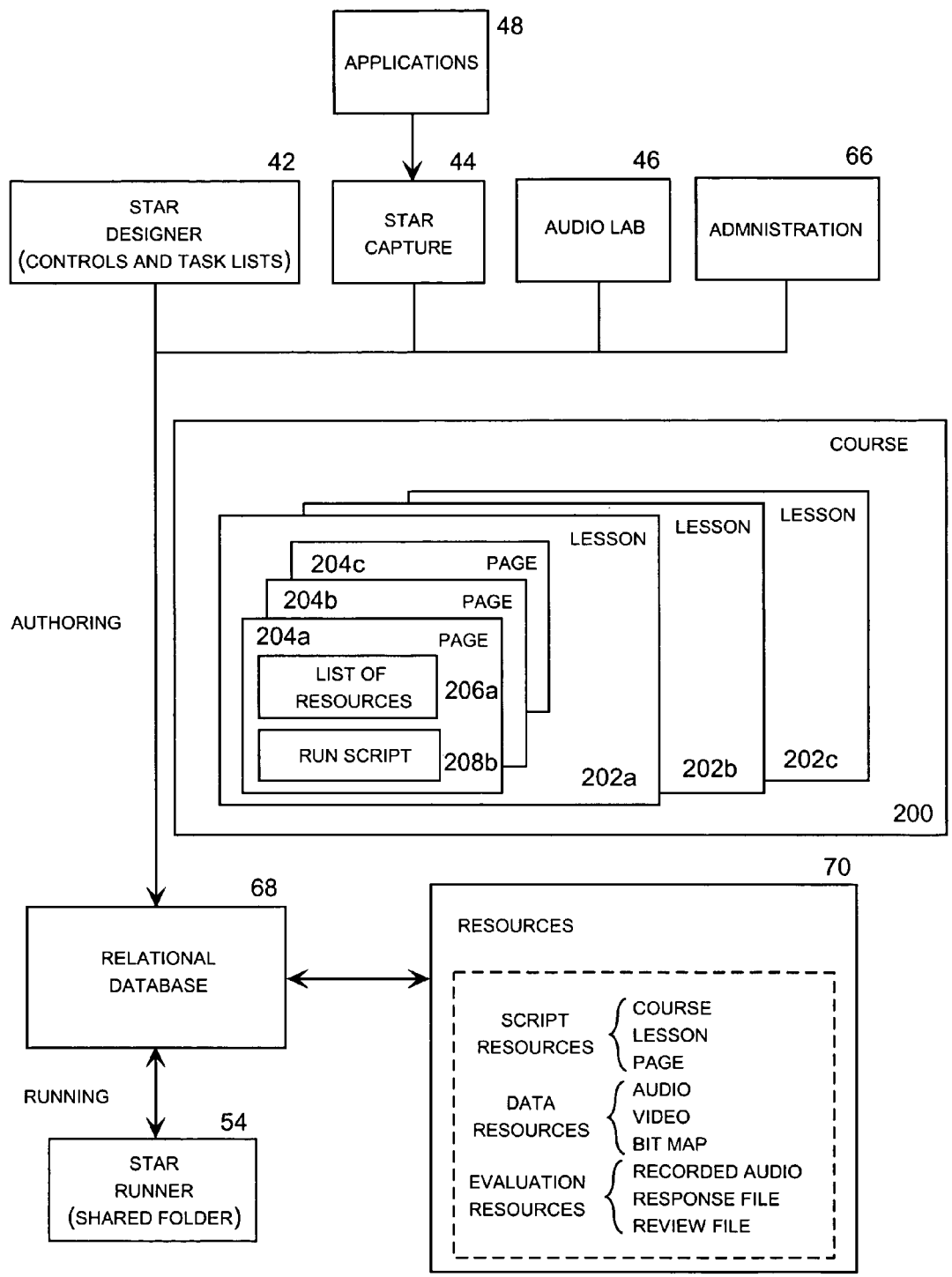
FIG. 2 is a functional block diagram illustrating the authoring and running modes in a CBT system.

FIG. 2 is a functional block diagram illustrating the authoring and running modes of the CBT system 10. First, during an authoring phase, a lesson designer uses the StarDesigner application 42 to create one or more lessons. During this process, the StarCapture application 44 may be used to import screen objects into the lesson from other applications 48. In addition, the AudioLab application program 46 is used to create and store sound files, and the administration utility 66 is used to perform administrative functions, such as assigning particular lessons to particular students. In general, a course 200 may include multiple lessons represented by the lessons 202*a–c*. Each lesson includes a list of pages represented by the pages 204*a–c*. That is, a lesson points to a list of pages but does not physically include the pages themselves. Each page, in turn, includes a list of resources 206 referenced by that page and run script 208 for implementing the lesson logic for the page. Again, each page points to a list of resources but does not physically include the resources themselves. This allows each page and each resource to be configured as a stand-alone unit that may be independently stored and retrieved from memory for use in multiple lessons.

The relational database 68 contains administrative information along with information for retrieving desired resources for display or play in association the lessons. That is, as a StarRunner application 54 runs a lesson, it accesses that relational database 68 "on the fly" to determine information that allows the StarRunner application to retrieve the pages and resources 70 to be played or displayed as part of the lesson. Generally, the resources 70 include three categories of resources, all of which are independently stored and retrieved from memory. The first category includes script resources that include lesson logic. This category includes courses (lists of lessons), lessons (lists of pages), and pages (lists of resources with associated run script). The second category includes data resources that can be played or displayed during a simulation. These resources include audio files, video files, and bit maps. The third category includes evaluation resources that are recorded while a student takes a lesson. These resources include recorded audio files, response files, and review files.

A recorded audio file typically includes the student's voice as recorded during a lesson. A response file typically includes a student's inputs entered into the student's workstation in response to tasks that the student is asked to perform during a lesson. And a review file typically includes a vector file documenting mouse and keyboard actions during a lesson. For evaluation purposes, a recorded audio file and a review file can be played in association with the corresponding lesson to playback the result of a student's actual verbal and physical mouse and keyboard movements during a previously taken lesson. This type of review file, in which the student's actual movements and utterances can be reviewed, is superior to the knowledge-based testing approach for many applications. Importantly, the vector file requires a small fraction of the memory storage that would be required to store a video file documenting the training session.

Figure 3:
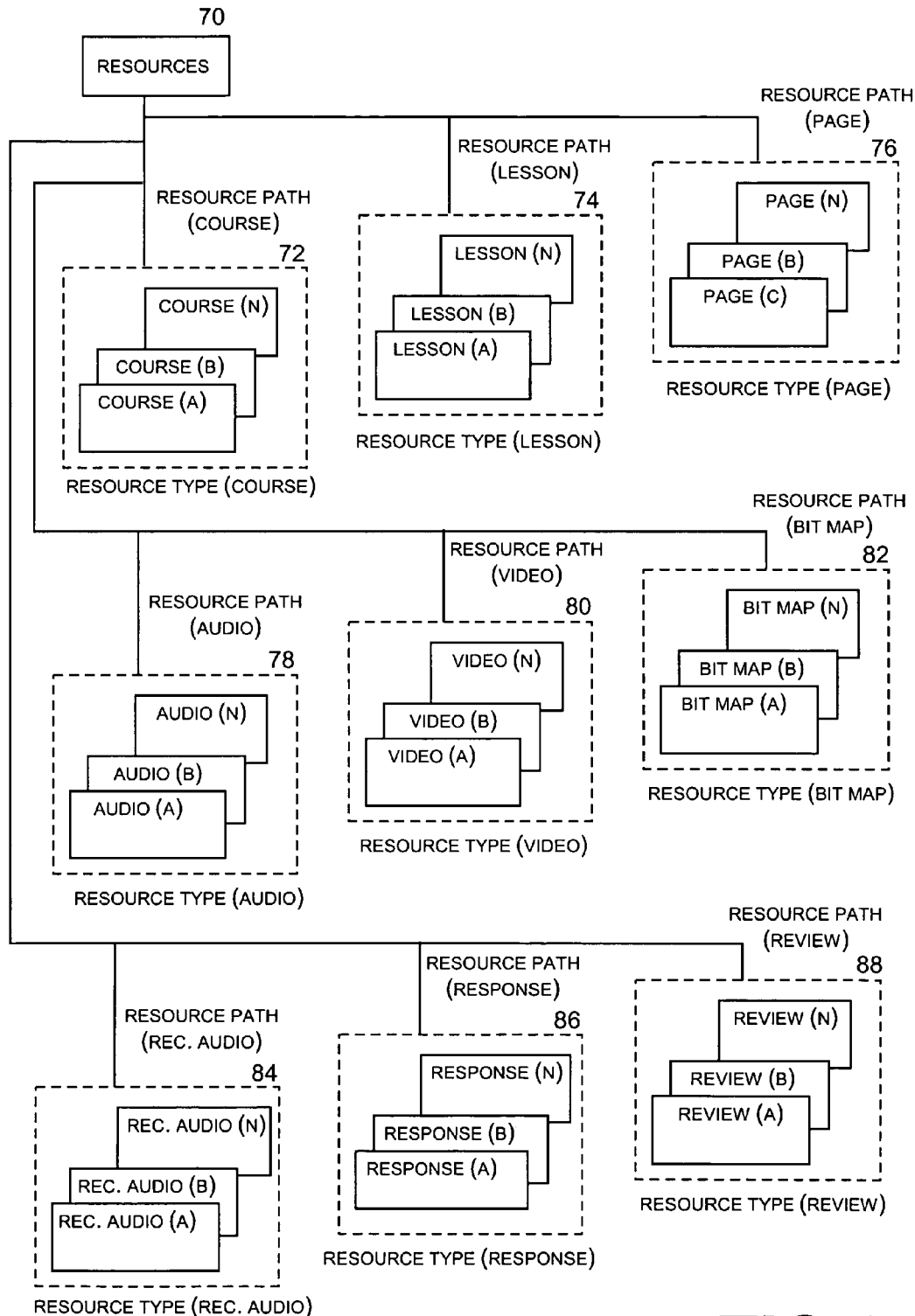
FIG. 3 is a diagram illustrating a root path system for storing versatile resources in a CBT system.

FIG. 3 is a diagram illustrating a root path system for storing versatile resources 70 in the CBT system 10. To facilitate the retrieval of resources from memory "on the fly," the resources 70 are subdivided into a plurality of resource types, with each resource type including one or more similar resources. Specifically, courses are assigned to a first resource type 72, lessons are assigned to a another resource type 74, pages are assigned to a another resource type 76, audio files are assigned to a another resource type 78, video files are assigned to a another resource type 80, bit maps are assigned to a another resource type 82, recorded audio files are assigned to a another resource type 84, response files are assigned to a another resource type 86, and review files lessons are assigned to a another resource type 88. Each resource is assigned a resource name, and each resource type is assigned a resource type name. The resource name and resource type name assigned to a particular resource defines a root path for retrieving that resource from memory. Thus, the resource name and resource type name for each resource may be retrieved from the relational database 68 and appended together to create the root path for retrieving that resource from memory.

Figure 4A:
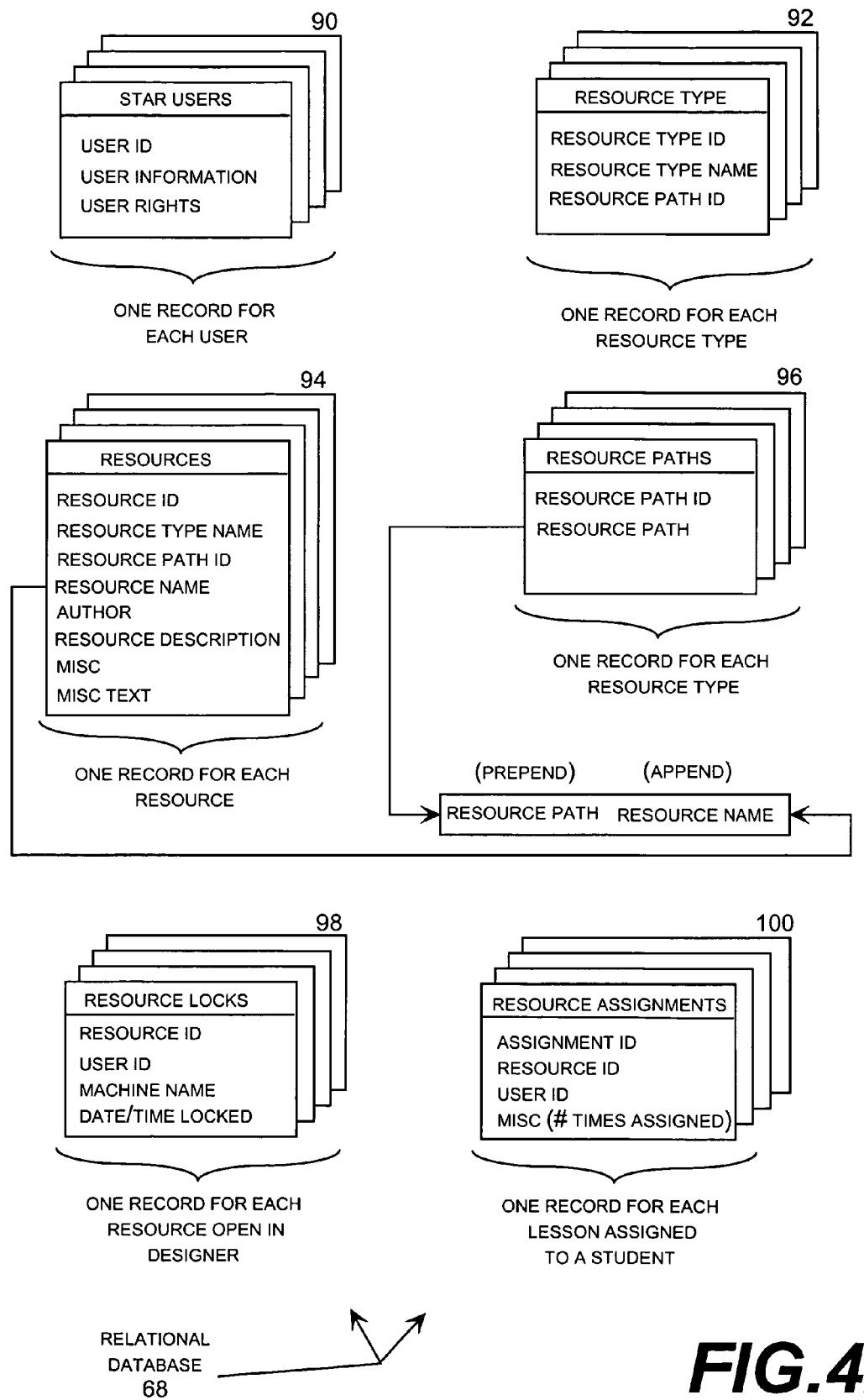
FIG. 4A is a diagram illustrating tables of a relational database employed in a CBT system.

FIG. 4A is a diagram illustrating tables of a relational database 68 employed in the CBT system 10. A Star Users table 90 includes a record for each authorized user of the CBT system 10. Each record of the Star Users table 90 includes a user identification number, user information, and a designation of user rights. The hierarchy of user rights typically include super administrators, administrators, lesson designers, and students. That is, a higher level in the hierarchy typically enjoys all the rights of the lower levels plus additional rights. Super administrators can add and delete administrators and access program code. Administrators can add and delete students and authors, and can also access response, review, and recorded audio files for student evaluation. Lesson designers can add and delete lessons and assign to students or remove lesson assignments. Students are only authorized to take lessons. The user information typically includes items such as address, telephone number, e-mail address, job title, department number, employee number, login password, and so forth. The Star Users table 90 is a dynamic table that changes whenever a user record is added, deleted or changed.

A Resource Type table 92 includes a record for each type of resource of the CBT system 10. In the illustrated embodiment, the resource types include courses, lessons, pages, audio files, video files, bit maps, recorded audio files, response files, and review files. Each record of the Resource Type table 92 includes a resource type identification number, a resource type name, and a resource path identification number. The Resource Type table 92 is a static table that would change only if a new resource type was added to the CBT system 10.

A Resources table 94 includes a record for each resource of the CBT system 10. Each record of the Resources table 94 includes a resource identification number, the resource type name, the resource path identification number, a resource name, the name of the author of the resource, a description of the resource, a miscellaneous field, and a miscellaneous text field. The resource name is used as part of the root path for retrieving resources of that particular type from storage. The Resources table 94 is a dynamic table that changes whenever a resource is added, deleted or changed. The miscellaneous field typically includes a "locked flag" that indicates whether the resource is locked. The miscellaneous text field is presently reserved for future use.

A Resources Paths table 96 includes a record for each type of resource of the CBT system 10. Each record of the Resources table 94 includes the resource path identification number, and the resource path name, which is used as part of the root path for retrieving resources of that particular type from storage. That is, the resource path name from the Resources Paths table 96 may be appended to the resource name from the resource name from the Resources table 94 to obtain the root path for retrieving a particular resources from storage. The Resources Paths table 96 is a static table that would change only if a new resource type was added to the CBT system 10.

A Resources Locks table 98 includes a record for each resource that is open in the StarDesigner application 42. This table allows the CBT system 10 to lock lesson designers out of a particular resource while another lesson designer is working on that same resource. This prevents multiple lesson designers from making inconsistent changes to the same resource at the same time. Each record of the Resources Locks table 98 includes a resource identification number for the open resource, a user identification for the user who has the resource open, the machine name where the resource is open, and the date and time when the resource was opened. The Resources Locks table 98 is a dynamic table that changes whenever a user opens a record in StarDesigner.

A Resources Assignments table 100 includes a record for lesson assigned to a student. This table allows the CBT system 10 to keep track of lesson assignments. Each record of the Resources Assignments table 100 includes an assignment identification number, the resource identification number for the assigned lesson, a user identification for the student assigned the lesson, and a miscellaneous field that may indicate the number of times that the student has taken, or is assigned to take, the lesson. This may be a dynamic field that counts up or down to a predefined limit and, once the limit has been reached, the student may not be allowed to take the lesson again. The Resources Assignments table 100 is a dynamic table that changes whenever a lesson is assigned to a user, and may also change whenever a student takes a lesson.

Figure 4B:
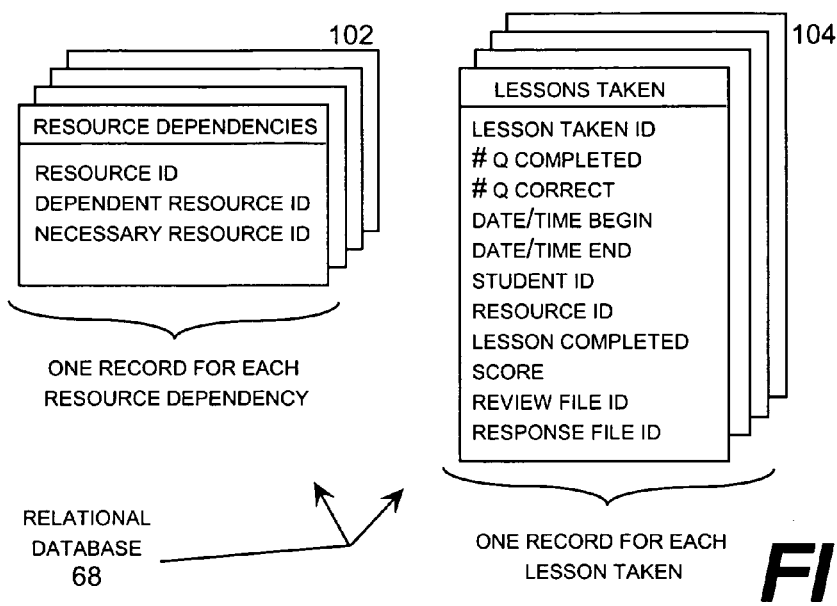
FIG. 4B is a diagram illustrating additional tables of the relational database of FIG. 4A.

FIG. 4B is a diagram illustrating additional tables of the relational database 68 of FIG. 4A. A Resources Dependencies table 102 includes a record for each resource that points to or calls another resource. This table allows the CBT system 10 to prevent the deletion of resources that are used by other resources. Each record of the Resources Dependencies table 102 includes a resource identification number for a subject resource, a resource identification number for a resource that is dependent on the subject resource, and a resource identification number for a resource on which on the subject resource depends. The Resources Dependencies table 102 is a dynamic table that changes whenever a link to a resource is added or deleted.

A Lessons Taken table 104 includes a record for each lesson taken. This table allows the CBT system 10 to keep track of lessons as they are assigned and taken by the students. Each record of the Lessons Taken table 104 includes a lesson identification number for a particular lesson taken by a particular student, an indication of the number of questions of the lesson completed by the student, an indication of the number of questions that were answered correctly, the date and time the student began the lesson, the date and time the student completed the lesson, the student identification number for the student who took the lesson, the resource identification number for the lesson, an indication whether the lesson was successfully completed, a score computed in accordance with lesson logic configured into the lesson by the lesson designer, a review file identification number, and a response file identification number. The Lessons Taken table 104 is a dynamic table that changes whenever a link to a resource is added or deleted.

FIGS. 5–18 are logic flow diagrams illustrating methodologies implemented by the CBT system 10. The description of these figures will refer to element numerals of the physical embodiment shown in FIG. 1, as well as the database configuration shown in FIGS. 4A–B.

Figure 5:
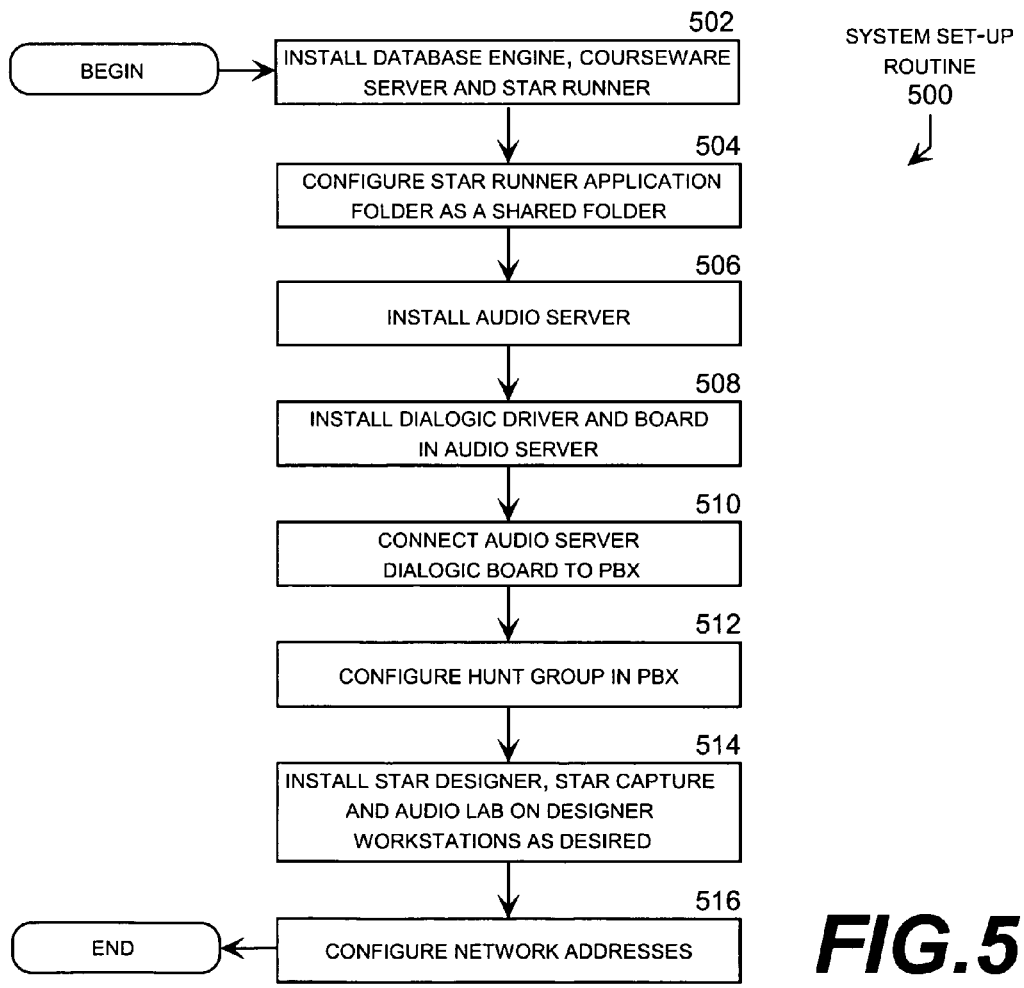
FIG. 5 is a logic flow diagram illustrating a set-up routine for a CBT system.

FIG. 5 is a logic flow diagram illustrating a set-up routine 500 for the CBT system 10. In step 502, a technician installs the database engine 60, the courseware server software 62, and the StarRunner application 54 on the courseware server workstation 18. Step 502 is followed by step 504, in which the technician configures the StarRunner application folder as a share folder. This gives the student workstations 20 access to the StarRunner application. Step 504 is followed by step 506, in which the technician installs the audio server software 28 on the audio server workstation 16. Step 506 is followed by step 508, in which the technician installs the DIALOGIC telephone card(s) 32 and the associated software driver in the audio server workstation 16. Step 508 is followed by step 510, in which the technician uses the telephone trunk 34 to connect the DIALOGIC telephone card(s) 32 to the PBX 14. Typically, each telephone line of the trunk 34 connects to an associated audio port on the DIALOGIC telephone card(s) 32. Step 510 is followed by step 512, in which the technician configures the PBX 14 with a hunt group 36 for the lines of the trunk 34, which are connected to the ports of the DIALOGIC telephone card(s) 32. Step 512 is followed by step 514, in which the technician installs StarDesigner 42, StarCapture 44, and AudioLab 46 on one or more designer workstations 22, as desired. Step 514 is followed by step 516, in which the technician configures the designer workstations 22 with network address for the Courseware Server workstation 18. This completes the set-up routine 500.

Figure 6A:
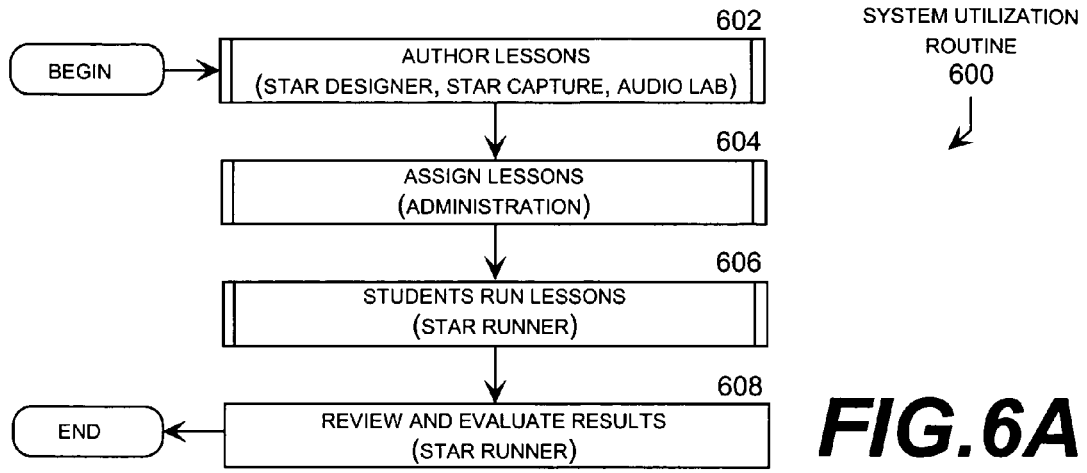
FIG. 6A is a logic flow diagram illustrating a system utilization routine for a CBT system.
Figure 20:
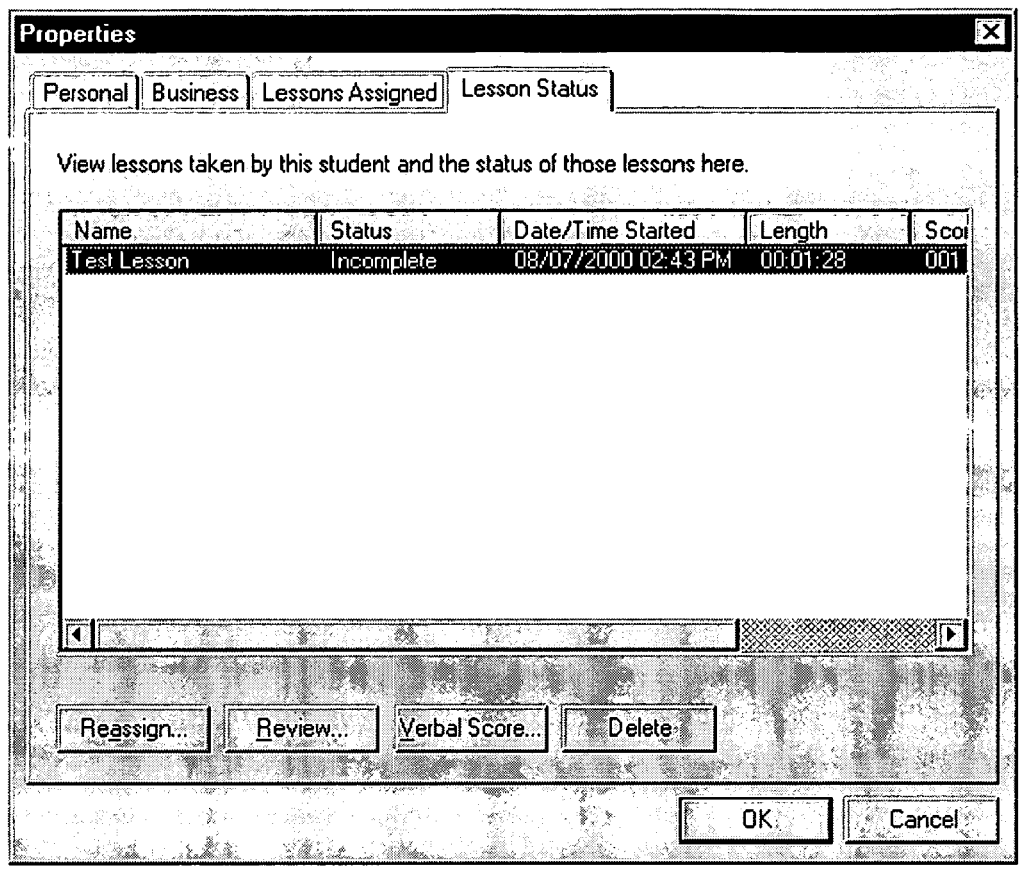
FIG. 20 is an illustration of a CBT system user interface for reviewing a lesson result.

FIG. 6A is a logic flow diagram illustrating a system utilization routine 600 for the CBT system 10. In routine 602, a lesson designer authors one or more lessons using StarDesigner 42, StarCapture 44, and AudioLab 46 one of the designer workstations 22. Routine 602 is described in greater detail with reference to FIG. 6B. Routine 602 is followed by routine 604, in which an administrator assigns one or more lessons to one or more students. Routine 604 is described in greater detail with reference to FIG. 12. Routine 604 is followed by routine 606, in which a student takes one or more lessons using an instance of the StarRunner application 54. Routine 606 is described in greater detail with reference to FIG. 13. Routine 606 is followed by step 608, in which an administrator may review the audio response files, the review files, or the response files recorded or complied while the students took the lessons. In particular, a recorded audio file and a review file can be played in association with the corresponding lesson to playback the result of a student's actual verbal and physical mouse and keyboard movements during a previously taken lesson. FIG. 20 is an illustration of a CBT system user interface for selecting a reviewing file for this purpose. Although this completes the system utilization routine 600 as shown on FIG. 6A, it will be appreciated that this routine and its parts may be repeated many times as the CBT system is utilized.

Figure 6B:
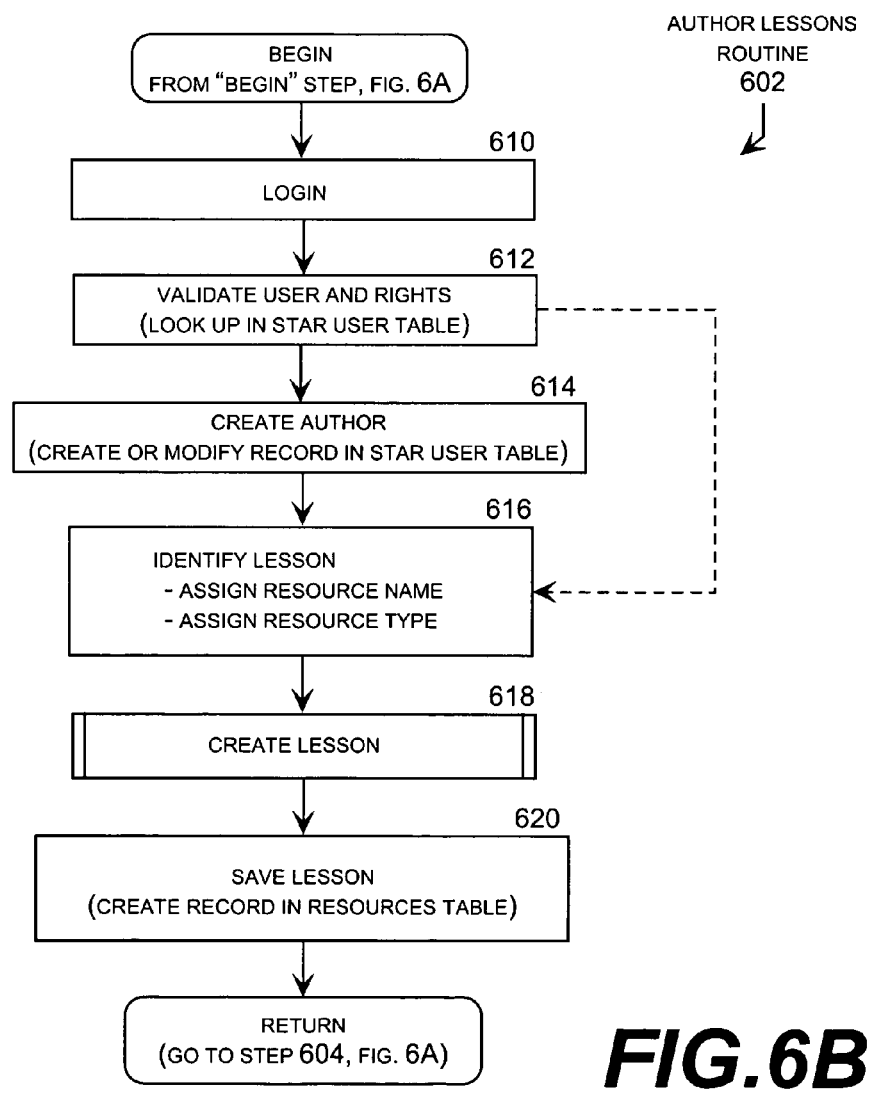
FIG. 6B is a logic flow diagram illustrating a routine for authoring lessons in a CBT system.
Figure 21:
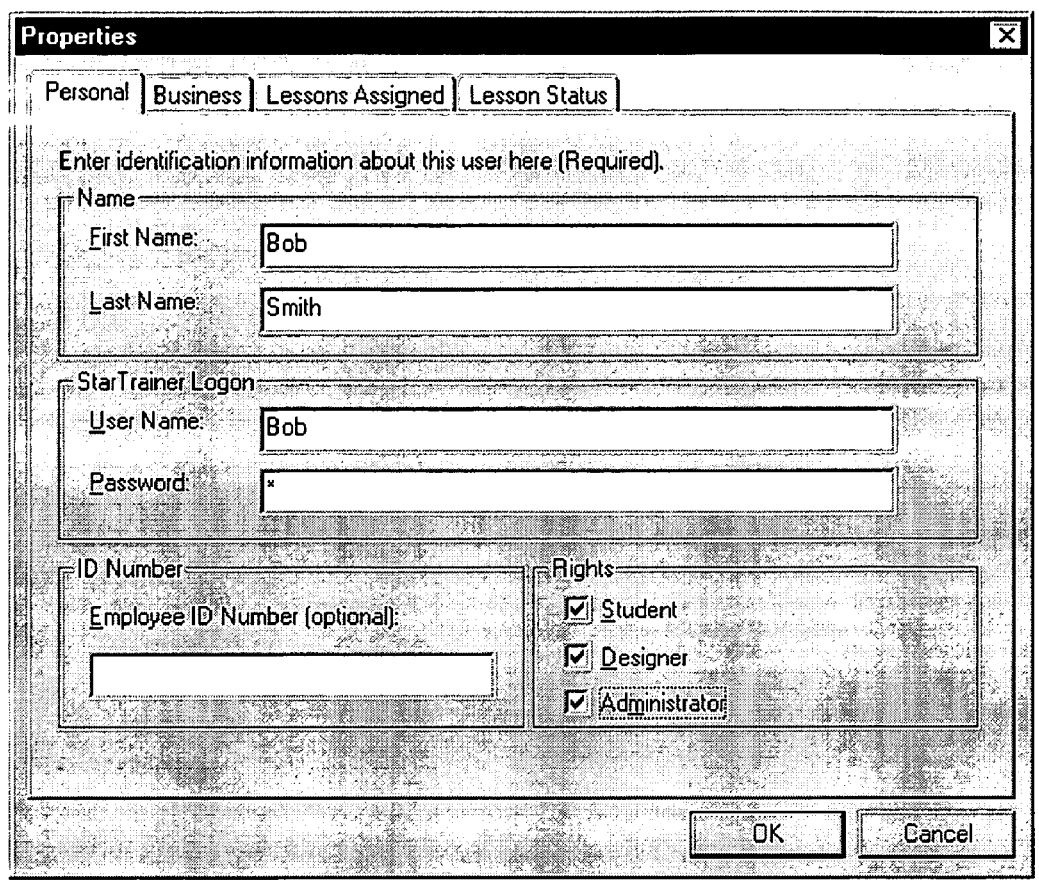
FIG. 21 is an illustration of a CBT system user interface for creating a new lesson author.

FIG. 6B is a logic flow diagram illustrating routine 602 for authoring lessons. Routine 602 follows the "BEGIN" step shown on FIG. 6A. In step 610 a lesson designer logs into the CBT system 10. Step 610 is followed by step 612, in which the courseware server 62 validates the user's identification and access rights by looking up the user's record in the Star Users table 90. If the user is authorized to create a new author (i.e., if the user is an administrator or super administrator), step 612 is followed by step 614, in which the user may create or delete one or more authors. This will create or delete records in the Star Users table 90. FIG. 21 is an illustration of the CBT system user interface that may be used to create an author in step 614.

If the user is authorized to create a new lesson (i.e., if the user is a designer or higher in the rights hierarchy), step 614 (if it was performed) or step 612 is followed by step 616, in which the user assigns a resource name and a resource type to a new lesson. Step 616 is followed by routine 618, in which the lesson designer creates the lesson. Routine 618 is described in greater detail with reference to FIG. 8. Routine 618 is followed by step 620, in which the lesson designer saves the new lesson. This creates new record in the Resources table 94 for the new lesson. Step 620 is followed by the "RETURN" steps, which returns to step 604 shown on FIG. 6A.

Figure 7:
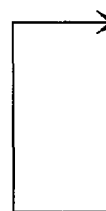
FIG. 7 is a logic flow diagram illustrating a routine for authoring lessons involving progressive mentoring in a CBT system using versatile resources.

FIG. 7 is a logic flow diagram illustrating a routine 700 for authoring lessons involving progressive mentoring. Routine 700 represents a high level of lesson design, which is superimposed on the more mechanical methodology descried with reverence to FIG. 8. In other words, routine 700 describes a particular type of lesson methodology, whereas FIG. 8 describes the mechanics for creating any type of lesson using the CBT system 10. In the progressive mentoring training method, a lesson is divided into a plurality of skill-related task types, such as typing and speaking. Each task type is configured to selectively run in a demonstration mode in which user responses are not required to prompts relating to that task type, or in a training mode in which user responses are required to prompts relating to that task type. This allows the user to observe the lesson with all types of tasks in the demonstration mode, and then to practice the lesson with one type of task in the training mode while the other task is in the demonstration mode. Once the student becomes confident at these levels of mentoring, the student can "go solo" with all types of types of tasks operating in the training mode.

More specifically, in step 702 the lesson designer breaks the task down into two or more skill-related task types, such as typing and speaking. Step 702 is followed by step 704, in which the lesson designer creates the lesson methodology to demonstrate the desired practices. Step 704 is followed by step 706, in which the lesson designer creates a simulation for the lesson with all modes of communication performed automatically by the system. This is the "observation" mode, in which the student simply observes the system perform the tasks as a master. Step 706 is followed by step 708, in which the lesson designer recreates the lesson with one or more of the modes left for the student to perform. Step 708 is followed by step 710, in which the lesson designer decides whether to create another scenario for the lesson. If the designer does want to create another scenario, the "YES" branch loops back to step 708, in which the lesson designer creates another scenario for the lesson. If the designer does not want to create another scenario, the "NO" branch is followed to step 712, in which the lesson designer creates the selection screens and accompanying script logic for implementing the progressive mentoring lesson. This concludes routine 700.

Figure 8:
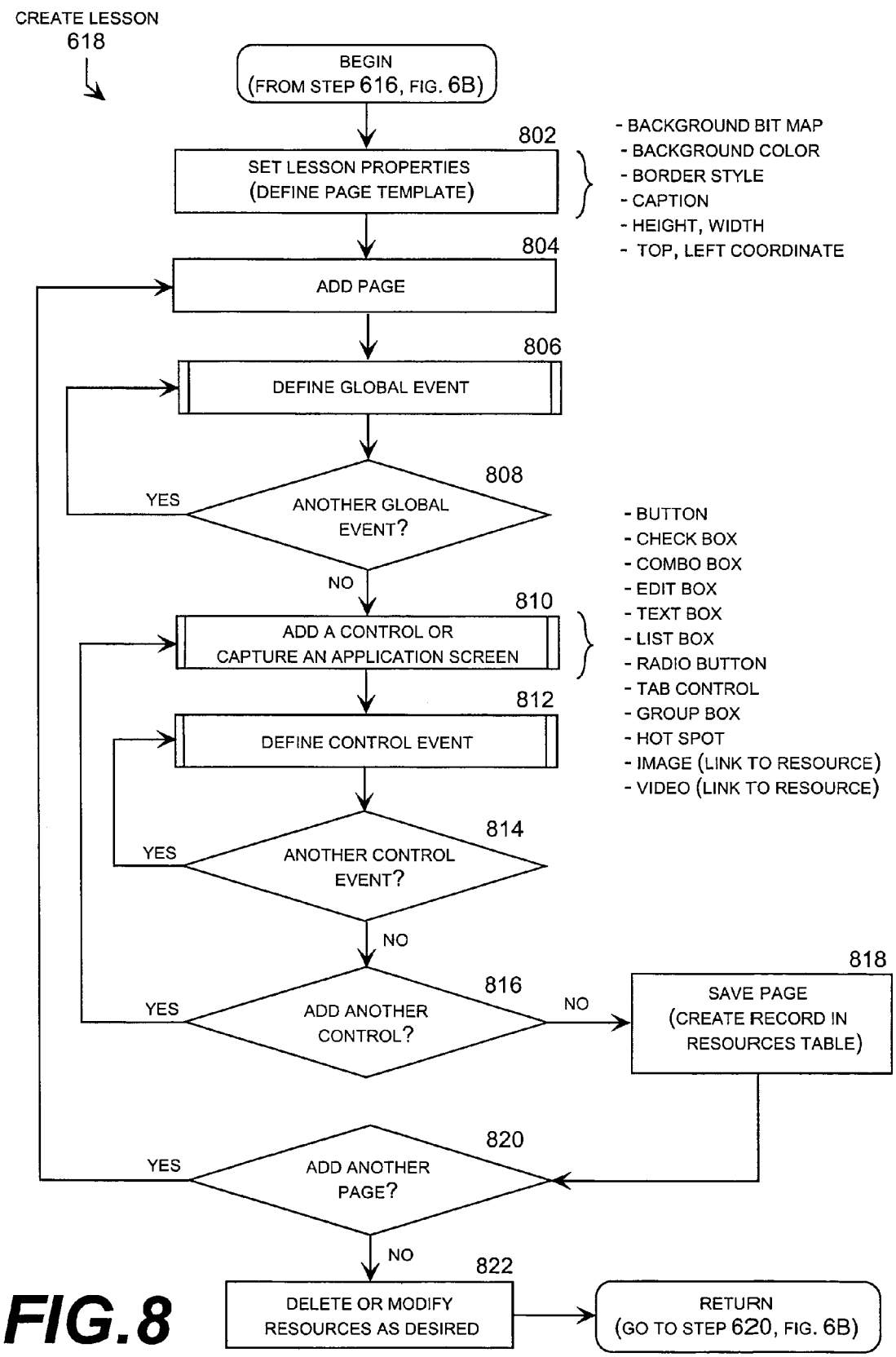
FIG. 8 is a logic flow diagram illustrating a routine for creating lessons in a CBT system.
Figure 22:
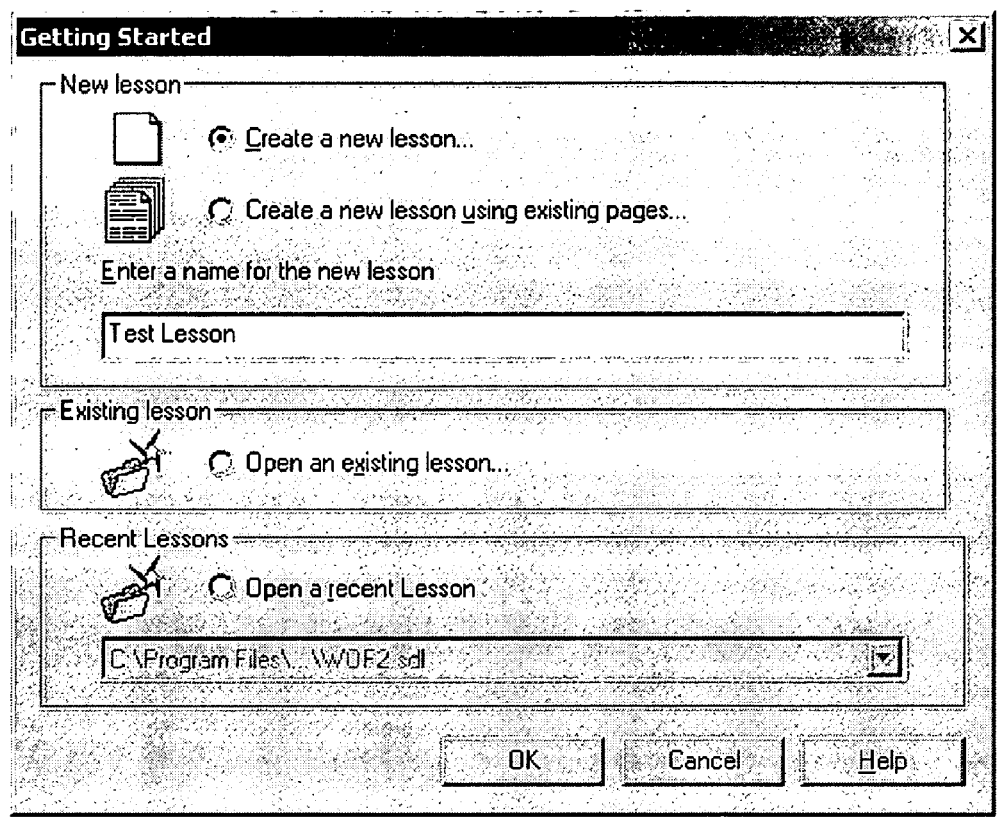
FIG. 22 is an illustration of a CBT system user interface for creating a new lesson.
Figure 23:
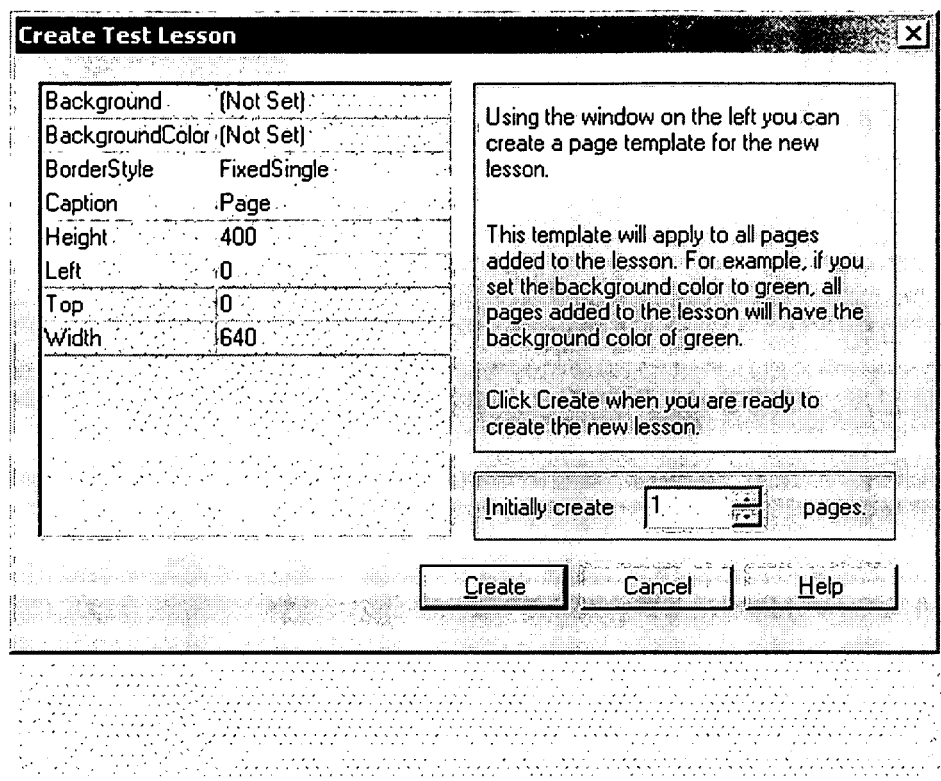
FIG. 23 is an illustration of a CBT system user interface for setting lesson properties.

FIG. 8 is a logic flow diagram illustrating routine 618 for creating lessons. Routine 618 follows step 616 shown on FIG. 6A. FIG. 22 is an illustration of a CBT system user interface that may be used to create a new lesson in step 618. In step 802, a lesson designer selects lesson properties to define a page template for the lesson. FIG. 23 is an illustration of a CBT system user interface that may be used to establish lesson properties in step 802. The lesson properties are standard WINDOWS tool kit properties for defining a window's appearance, such as a background bit map, a background color, a border style, a caption, the height and width of the window, and the coordinate of the top left corner of the window. Step 802 is followed by step 804, in which the lesson designer adds a page to the lesson. Step 804 is followed by routine 806, in which the lesson designer may define a global event for the page. Routine 806 is described in greater detail with reference to FIG. 9. Routine 806 is followed by step 808, in which the lesson designer decides whether to define another global event for the page. If the designer elects to create another global event for the page, the "YES" branch loops back to step 806, in which the lesson designer defines another global event for the page.

Figure 24:
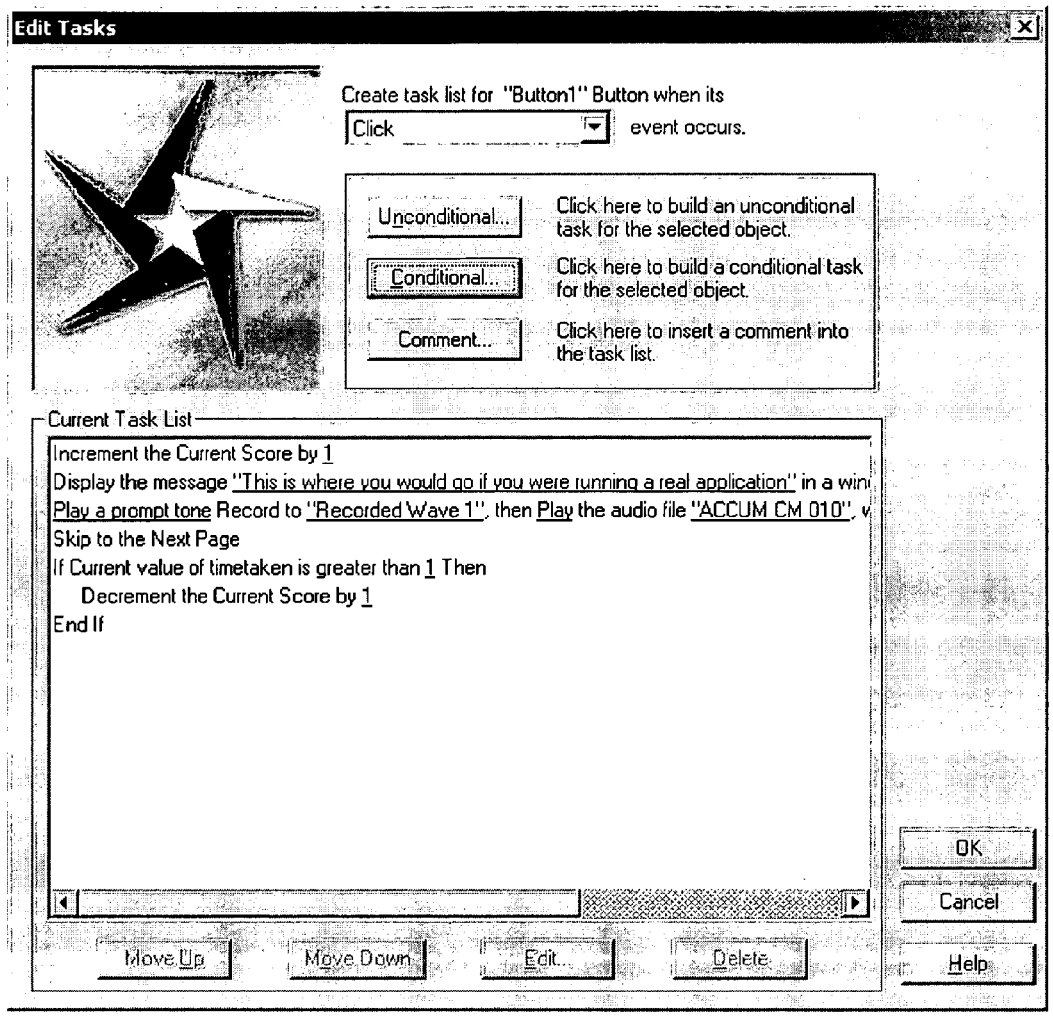
FIG. 24 is an illustration of a CBT system user interface for creating a task list for a control.

If the designer does not want to define another global event for the page, the "NO" branch is followed from step 808 to routine 810, in which the lesson designer may add a control or capture an application screen into the page. The controls are standard WINDOWS tool kit controls for defining a window's appearance and functionality, such as a button, check box, combo box, edit box, text box, list box, radio button, tab control, group box, hot spot, an image link to a separately stored resource, and a video link to a separately stored resource. Routine 810 is described in greater detail with reference to FIG. 10. Routine 810 is followed by routine 812, in which the lesson designer may define an event for the control. FIG. 24 is an illustration of a CBT system user interface that may be used to create a task list for a control in step 812. The process for defining a control event is the same as for defining a global event in routine 806, which is described in greater detail with reference to FIG. 9. Routine 812 is followed by step 814, in which the lesson designer decides whether to define another event for the control that the designer is presently working on. If the designer elects to create another control event for the page, the "YES" branch loops back to step 812, in which the lesson designer defines another event for the control.

If the designer does not want to define another event for the control, the "NO" branch is followed from step 814 to routine 816, in which the lesson designer may elect to add another control to the page that the designer is currently working on. If the designer elects to add another control to the page, the "YES" branch loops back to step 810, in which the lesson designer adds another control to the page. If the designer does not want to add another control to the page, the "NO" branch is followed to routine 818, in which the lesson designer saves the page. This creates a record in the Resources table 94 for the newly created page. Step 818 is followed by step 820, in which the lesson designer may elect to add another page to the lesson that the designer is currently working on. If the designer elects to add another page to the lesson, the "YES" branch loops back to step 804, in which the lesson designer adds another page to the lesson. If the designer does not want to add another control to the page, the "NO" branch is followed to routine 822, in which the lesson designer may modify or delete lessons, pages, or other resources as desired. Step 822 is followed the "RETURN" step, which returns to step 620 shown on FIG. 6B.

Figure 9:
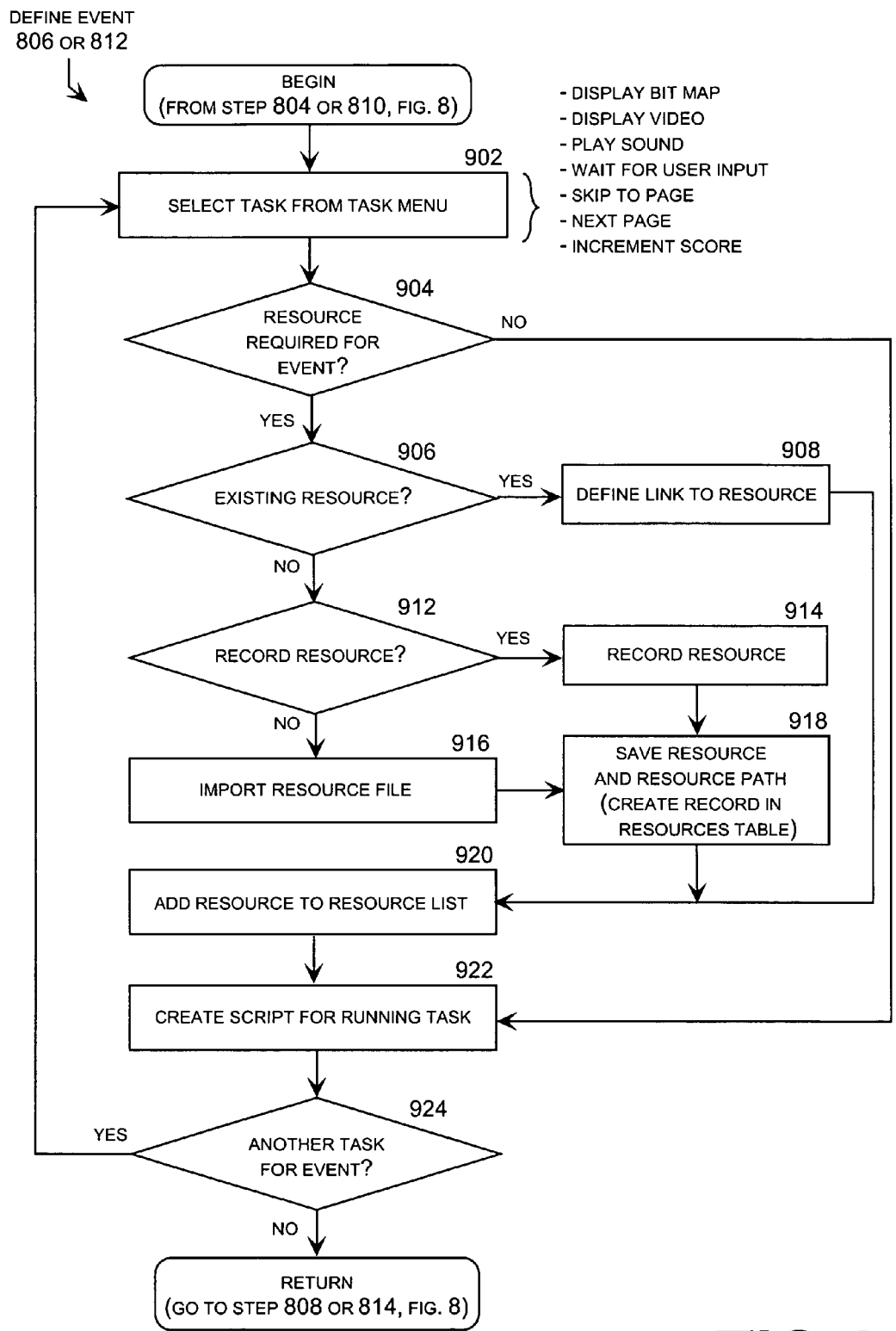
FIG. 9 is a logic flow diagram illustrating a routine for defining an event in a CBT system.

FIG. 9 is a logic flow diagram illustrating routines 806 and 812 for defining a global event or a control event, respectively. Routines 806 and 812 begin following steps 804 and 810, respectively, shown on FIG. 8. In step 902, the lesson designer may select a task from a task menu. These task allow the lesson designer to build lesson logic into a page or control, such as display a bit map, display a video file, play an audio file, wait for a user action, go to the next page in the lesson, skip to another specified page, and increment a score for the lesson. A complete list of the available tasks and their associated properties are included in FIGS. 34–38.

Figure 25:
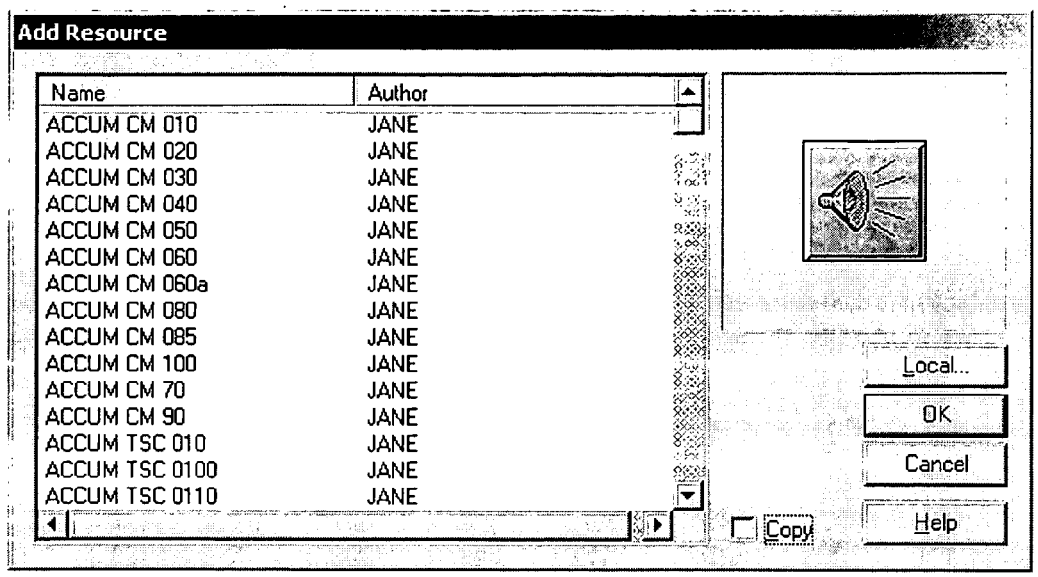
FIG. 25 is an illustration of a CBT system user interface for inserting audio files into a lesson.

Step 902 is followed by step 904, in which the lesson designer determines whether a resource is required for the event that the designer is programming. If a resource is not required for the event that the designer is programming, the "NO" branch loops down to step 922, in which the StarDesigner application 42 creates the Visual Basic script for running the selected task. If a resource is required for the event that the designer is programming, the "YES" branch is followed to step 906, in which the lesson designer determines whether the required resource already exists in the CBT system resources 70. If the resource already exists in the CBT system resources 70, the "YES" branch is followed to step 908, in which the lesson designer creates a link to desired resource. This creates a record in the Resource Dependencies table 102. FIG. 25 is an illustration of a CBT system user interface that may be used to link a page to an audio file in step 908. Step 908 is followed by step 920, in which the StarDesigner application 42 adds the new resource to the resource list for the current page.

If the resource does not already exists in the CBT system resources 70, the "NO" branch is followed from step 908 to step 912, in which the lesson designer specifies whether the desired resource is to be recorded at the present time. If the resource to be recorded at the present time, the "YES" branch is followed to step 914, in which the lesson designer records the resource. If the resource is not to be recorded at the present time then it is to be imported, and the "NO" branch is followed to step 916, in which the lesson designer imports the new resource. Steps 914 and 916 are followed by step 918, in which the lesson designer saves the newly recorded or imported resource. This creates a record for the new resource in the Resources table 94. Step 918 is followed by step 920, in which the StarDesigner application 42 adds the new resource to the resource list for the current page. Step 920 is followed by step 922, in which the StarDesigner application 42 creates the Visual Basic script for running the selected task. Step 922 is followed by step 924, in which the lesson designer may elect to add another task for the event that the designer is currently working on. If the designer elects to add another task for the event, the "YES" branch loops back to step 902, in which the lesson designer adds another task to the event. If the designer does not want to add another task to the event, the "NO" branch is followed to the "RETURN" step, which returns to step 808 or 814 shown on FIG. 8.

Figure 10:
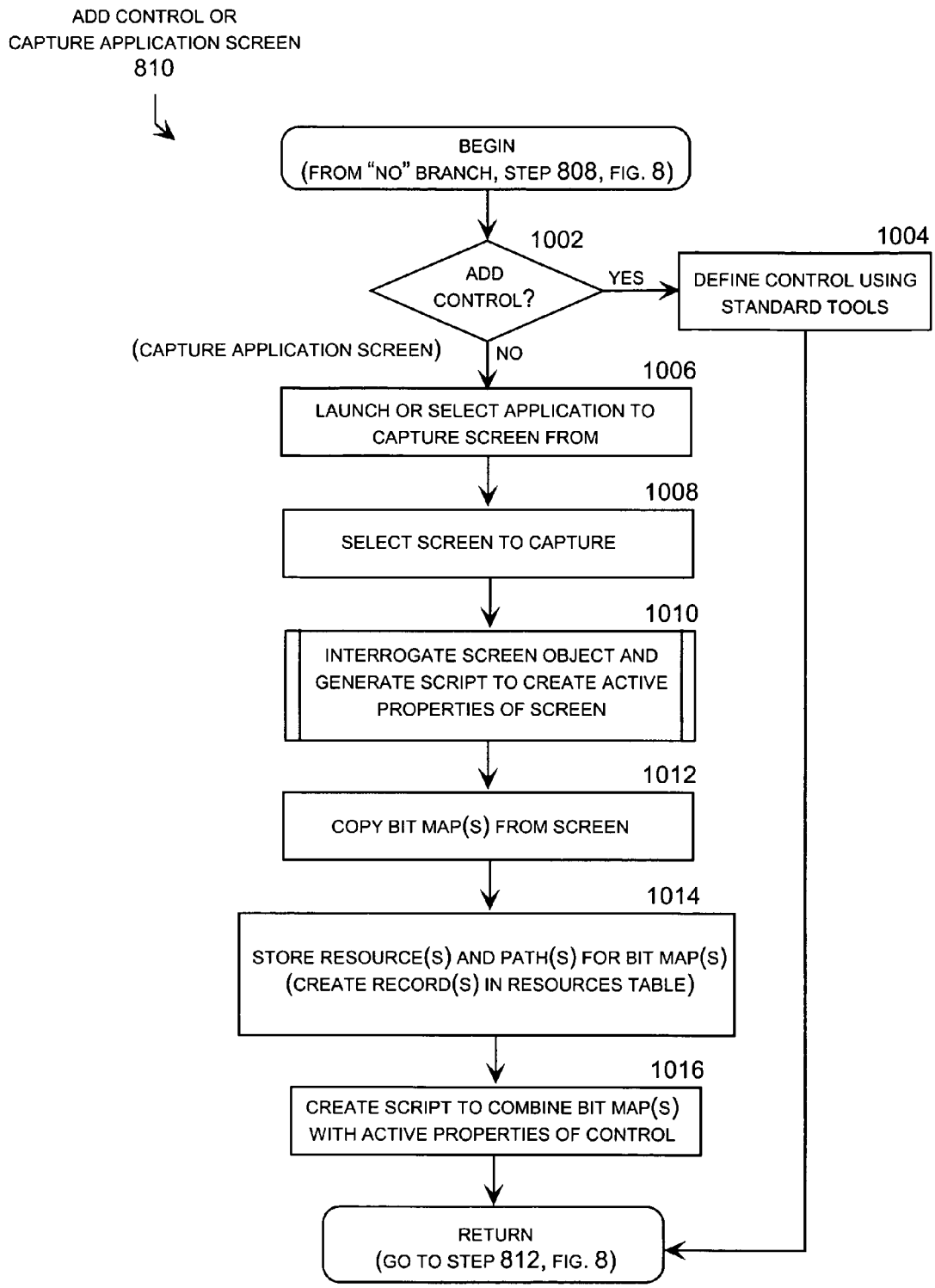
FIG. 10 is a logic flow diagram illustrating a routine for adding controls or capturing application screens in a CBT system.
Figure 26:
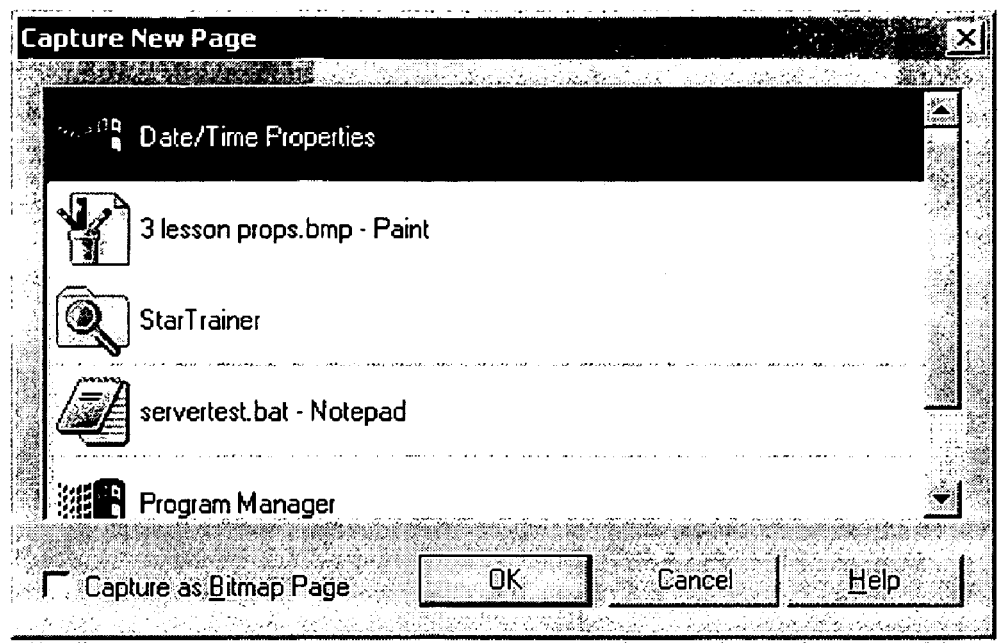
FIG. 26 is an illustration of a CBT system user interface for selecting an application screen to capture into a lesson.

FIG. 10 is a logic flow diagram illustrating routine 810 for adding controls or capturing application screens. Routine 810 follows the "NO" branch from step 808 shown on FIG. 8. In step 1002, the lesson designer elects whether to add a control or capture an application screen. If the lesson designer elects to add a control, the "YES" branch is followed to step 1004, in which the lesson designer adds the control using the standard features shown on FIGS. 34–38. If the lesson designer elects to capture an application screen, the "NO" branch is followed to step 1006, in which the lesson designer launches the application with the desired screen. Step 1006 is followed by step 1008, in which the lesson designer finds and selects the desired screen object. FIG. 26 is an illustration of a CBT system user interface that may be used to select an application screen to capture in step 1008. Step 1008 is followed by routine 1010, in which the lesson designer interrogates the screen object to recreate its controls. Basically, the capture feature interrogates a target screen object to identify screen object controls that are supported by the StarDesigner application 42. The capture feature then renders each screen object control within the current lesson page to recreate the functional and visual aspects of the screen object control. Routine 1010 is described in greater detail with reference to FIG. 11.

Figure 27:
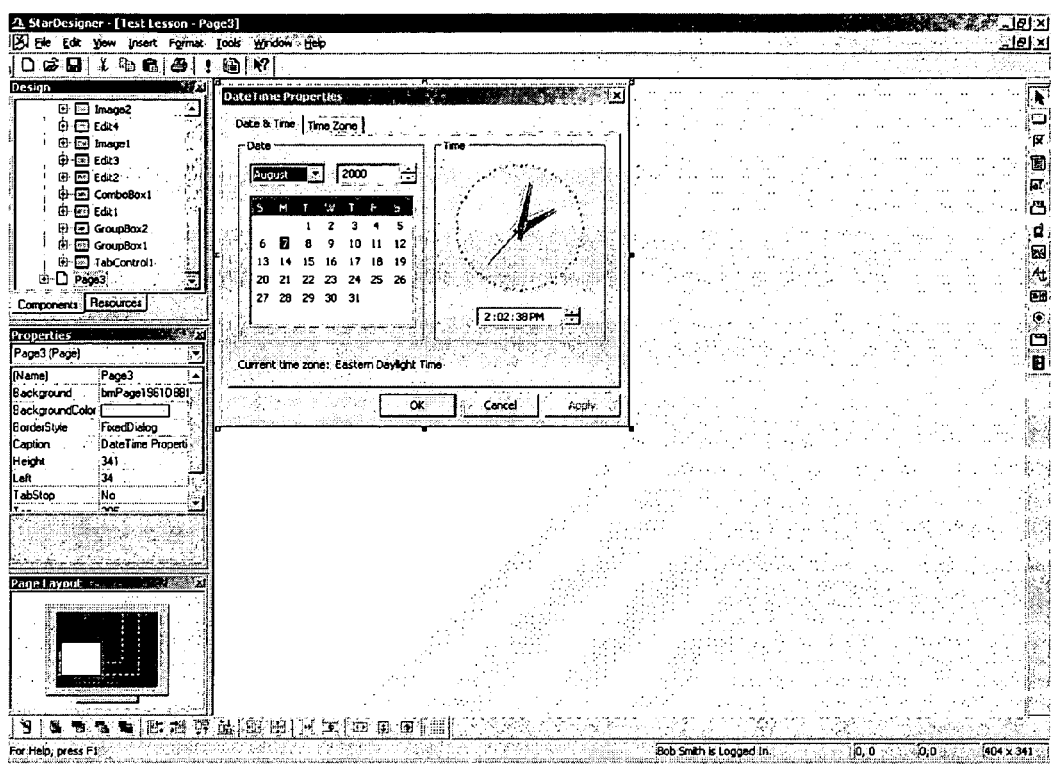
FIG. 27 is an illustration of a CBT system user interface including an application screen captured into a lesson.

Routine 1010 is followed by step 1012, in which the lesson designer extracts one or more screen object bit maps from the screen object corresponding to visual aspects of the screen object that do not correspond to screen object controls. Step 1012 is followed by routine 1014, in which the lesson designer saves the extracted bit maps as resources. This creates a record in the Resources table 94 for each saved bit map. Step 1014 is followed by step 1016, in which the StarDesigner application 42 creates the Visual Basic script for combining the extracted bit maps with the screen object controls to recreate the captured screen object on the current page. FIG. 27 is an illustration of a CBT system user interface that shows an imported application screen in step 1016. Step 1016 is followed by the "RETURN" step, which returns to step 812 shown on FIG. 8.

Figure 11:
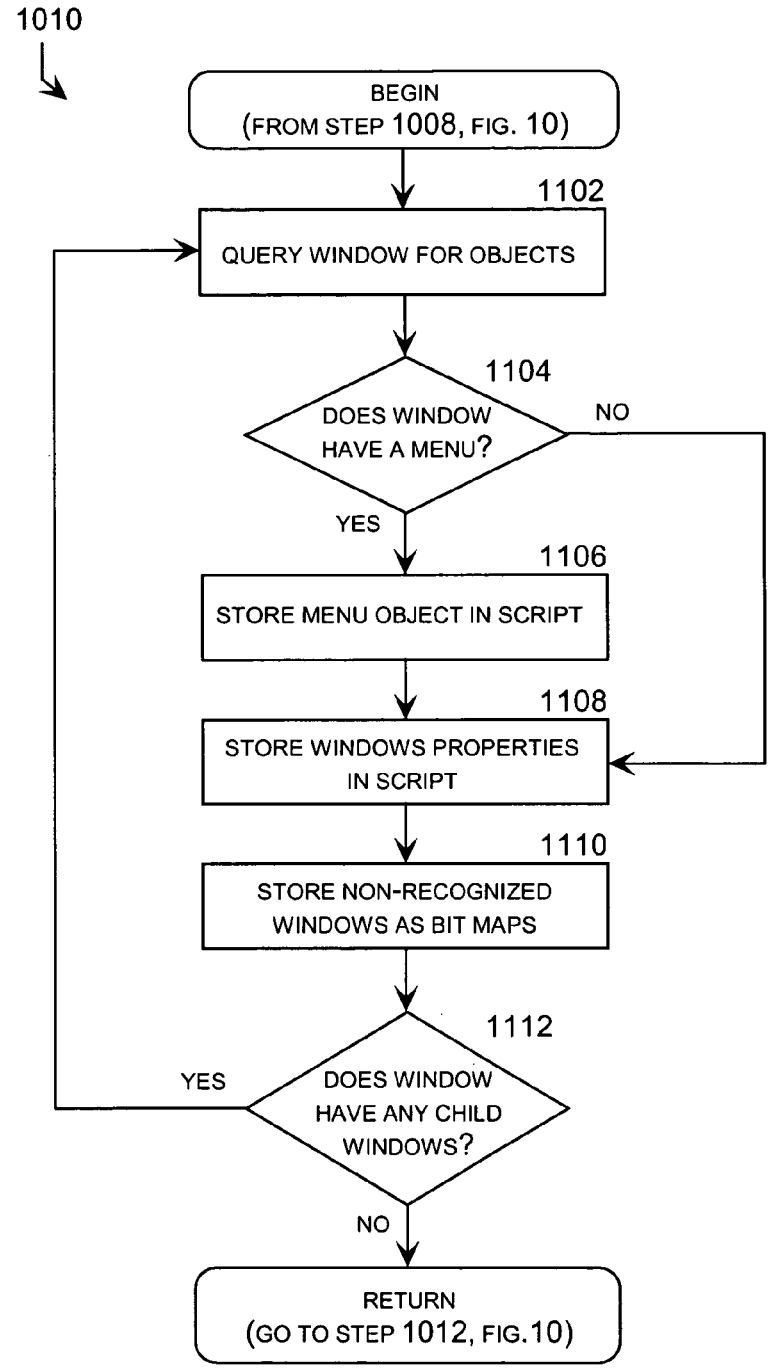
FIG. 11 is a logic flow diagram illustrating a routine for interrogating screen objects in a CBT system.

FIG. 11 is a logic flow diagram illustrating routine 1010 for interrogating a screen object. Routine 1010 follows step 1008 shown on FIG. 8. In step 1102, the StarCapture utility 44 interrogates the screen window for objects using its API interface. Step 1102 is followed by step 1104, in which the StarCapture utility 44 determines whether the screen window has a menu. If the screen window has a menu, the "YES" branch is followed to step 1106, in which the StarCapture utility 44 stores the menu in the script for the lesson page. Step 1106 and the "NO" branch from step 1104 are followed by step 1108, in which the StarCapture utility 44 stores the WINDOWS properties for the screen window in the in the script for the lesson page. Step 1108 is followed by step 1110, in which the StarCapture utility 44 stores any non-recognized windows as bit maps. These bit maps are then extracted and stored as resources, as described previously with reference to steps 1012 and 1014. Step 1110 is followed by step 1112, in which the StarCapture utility 44 determines whether the current window has a child window. If the current window has a child window, the "YES" branch loops back to step 1102, in which the StarCapture utility 44 queries the child window for objects.

Figure 12:
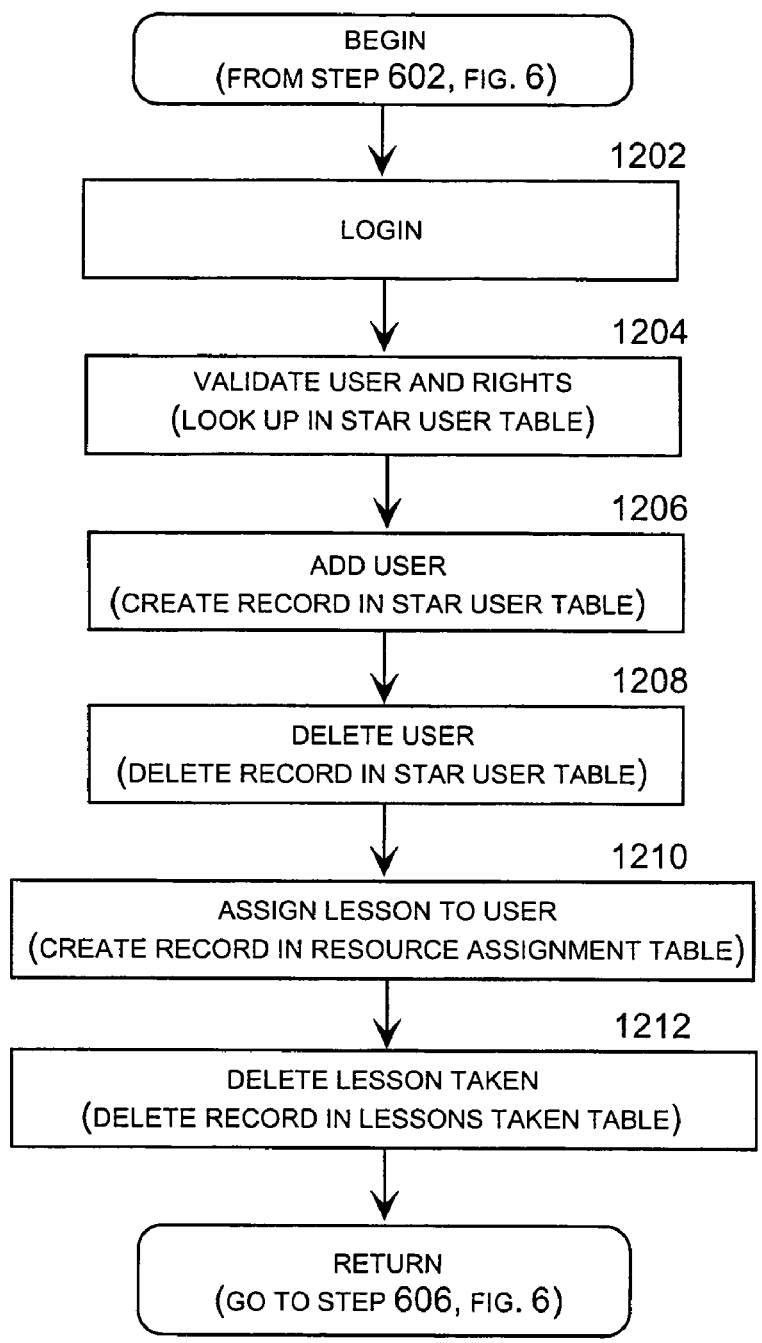
FIG. 12 is a logic flow diagram illustrating a routine for assigning lessons in a CBT system.

If the current window does not have a child window, the "NO" branch is followed by the "RETURN" step, which returns to step 1012 shown on FIG. 12.

Figure 28:
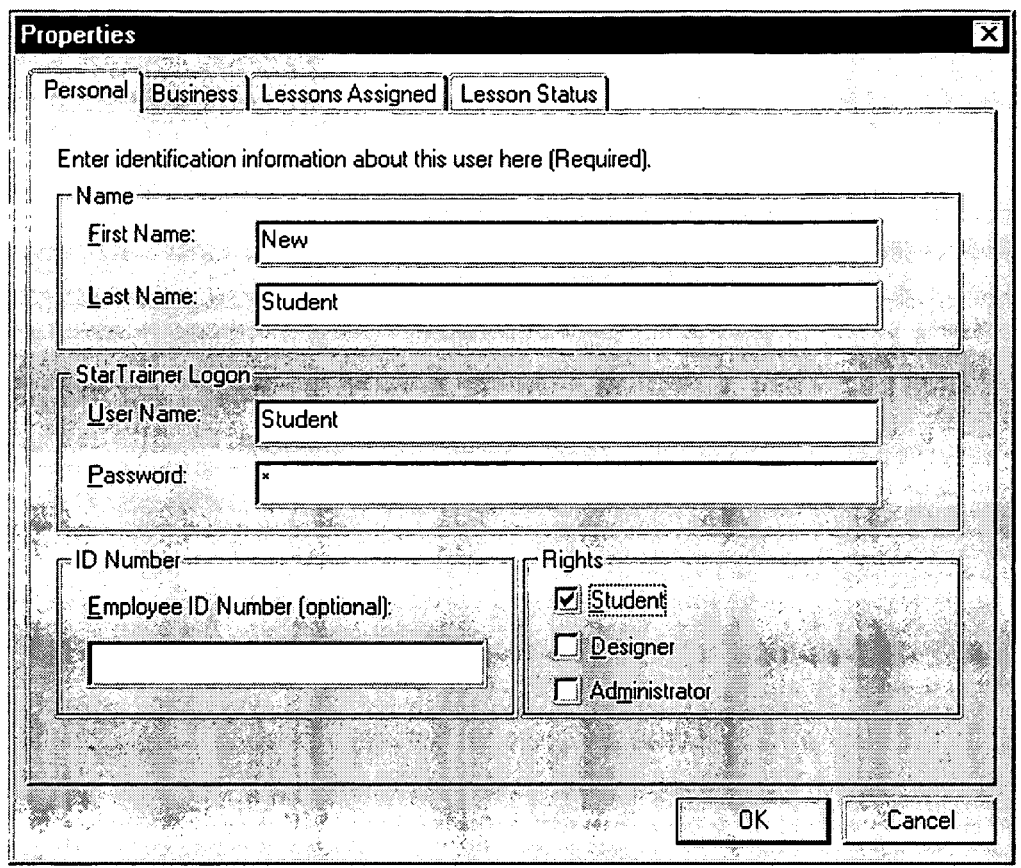
FIG. 28 is an illustration of a CBT system user interface for creating a new student.
Figure 29:
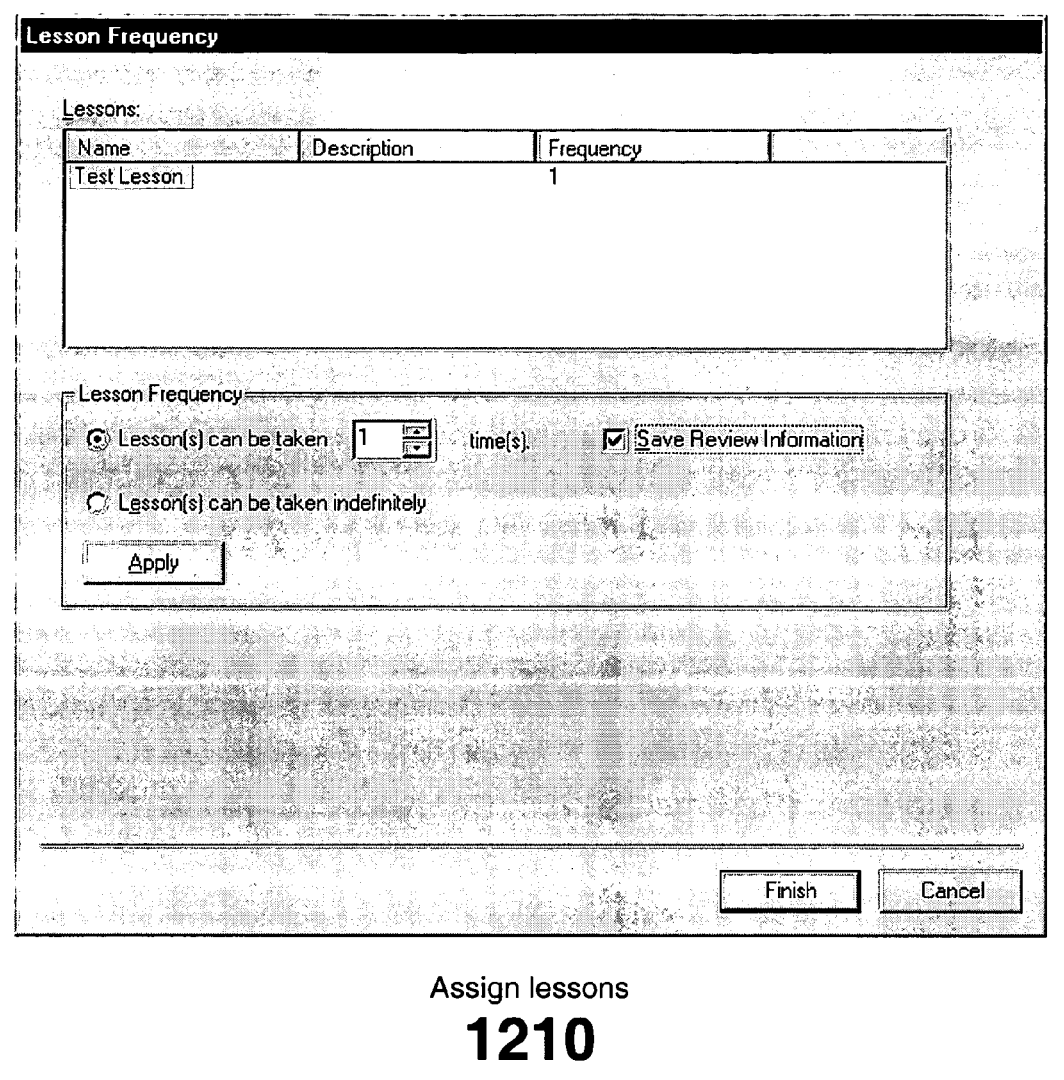

FIG. 12 is a logic flow diagram illustrating routine 604 for assigning lessons. Routine 604 follows routine 602 shown on FIG. 6A. In step 1202, an administrator or super administrator logs into the courseware server 62. Step 1202 is followed by step 1204, in which the courseware server 62 validates the user's identification and access rights by looking up the user's record in the Star Users table 90. If the user is authorized to assign lessons (i.e., if the user is an administrator or super administrator), step 1204 is followed by steps 1206 and 1208, in which the administrative user may create or delete one or more students. This will create or delete records in the Star Users table 90. FIG. 28 is an illustration of a CBT system user interface that may be used to add a new student in step 1206. Step 1208 is followed by step 1210, in which the administrative user may assign one or more lessons to one or more students, or remove one or more previously created assignments. FIG. 29 is an illustration of a CBT system user interface that may be used to assign lessons to students in step 1210. This will create or delete records in the Resource Assignments table 100. Step 1210 is followed by step 1212, in which the administrative user may delete records from the Lessons Taken table 104 if desired. Step 1212 is followed by the "RETURN" step, which returns to routine 606 shown on FIG. 6.

Figure 13:
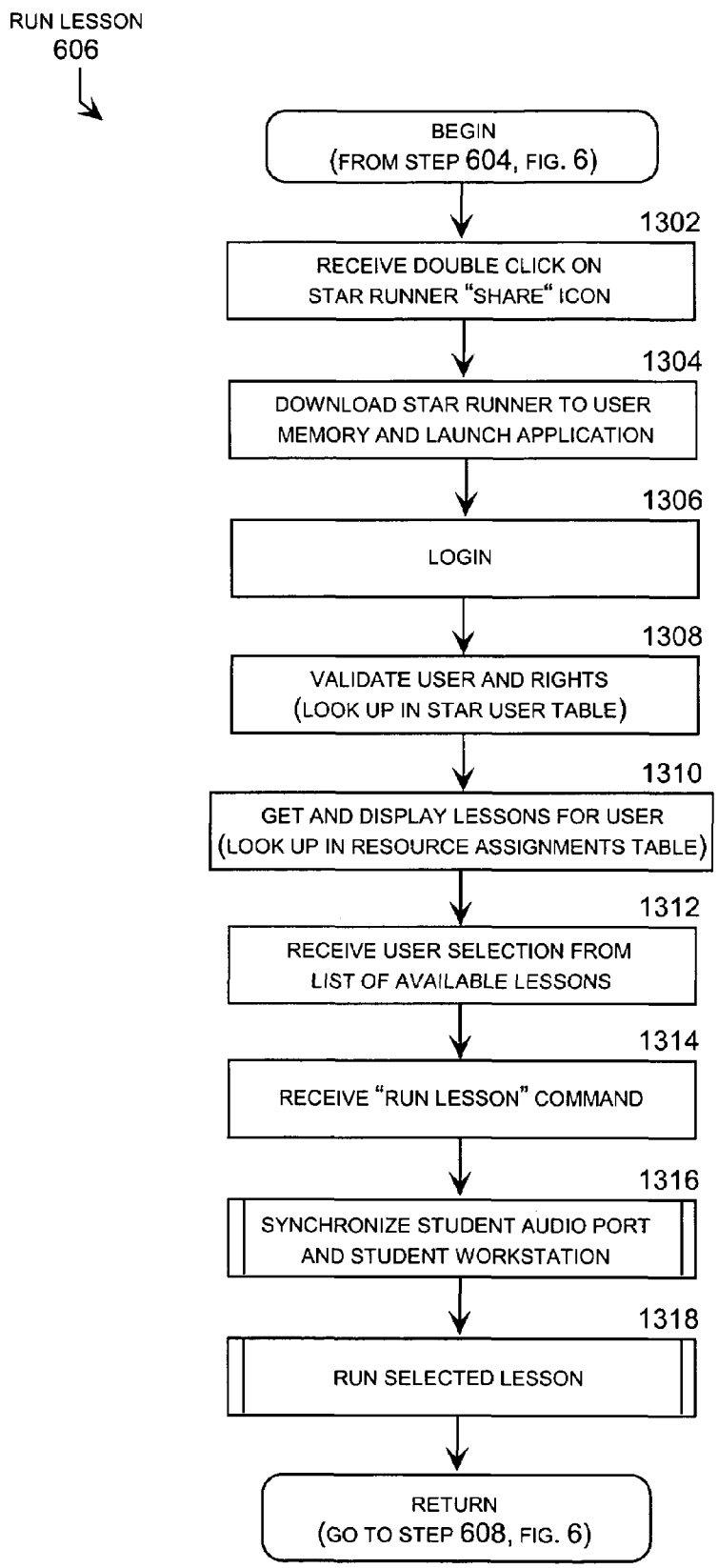
FIG. 13 is a logic flow diagram illustrating a routine for running lessons in a CBT system.
Figure 30:
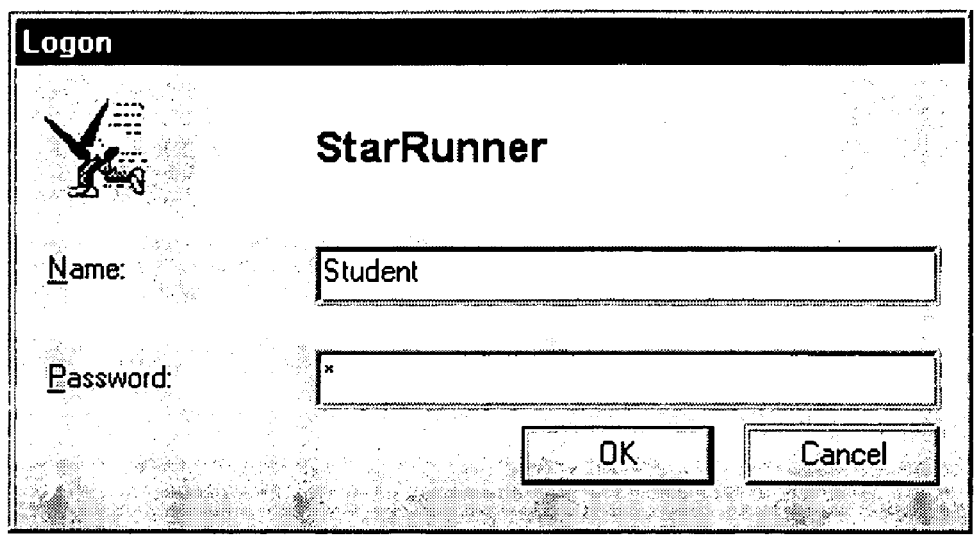
FIG. 30 is an illustration of a CBT system user interface for student login.
Figure 31:
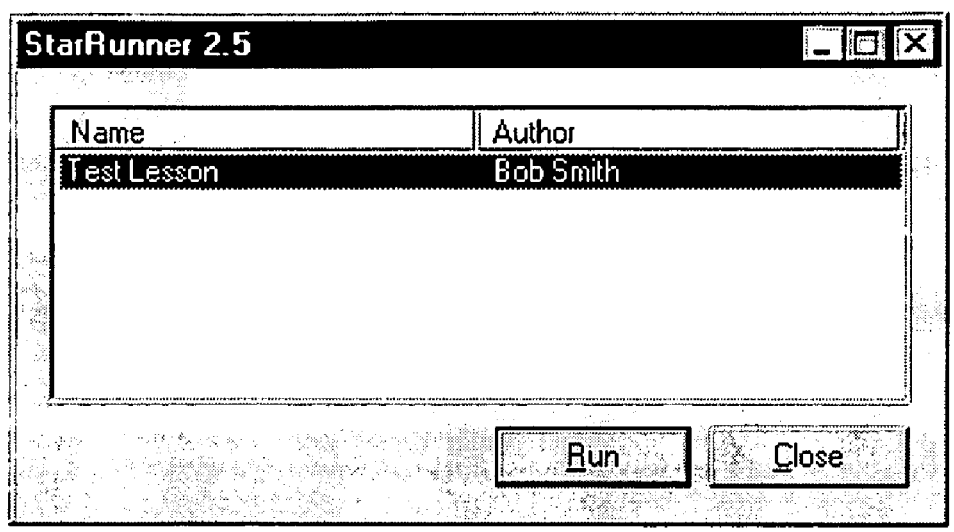
FIG. 31 is an illustration of a CBT system user interface for viewing lessons assigned to a student.

FIG. 13 is a logic flow diagram illustrating routine 606 for running lessons. Routine 606 follows routine 604 shown on FIG. 6A. In step 1302, a student workstation 20 receives a double click command on the StarRunner application icon in the shared network folder. Step 1302 is followed by step 1304, in which the courseware server 62 downloads an instance of the StarRunner application 54 to the student workstation 20 where the double click command originated. The local instance of the StarRunner application 54 then launches and runs within the memory space of the student workstation 20. Step 1304 is followed by step 1306, in which the StarRunner application 54 presents the student with a login screen, and the student logs in. FIG. 30 is an illustration of a CBT system user interface that may be used to log into the CBT system in step 1306. Step 1306 is followed by step 1308, in which the StarRunner application 54 validates the user's identification and access rights by looking up the user's record in the Star Users table 90. If the user is an authorized student, step 1308 is followed by step 1310, in which the StarRunner application 54 gets a list of assigned lessons by looking up the lessons assigned to the student in the Resource Assignments table 100. Step 1310 is followed by step 1312, in which the StarRunner application 54 presents the student with the list of available lessons and receives a selection of one of these lessons. FIG. 31 is an illustration of a CBT system user interface that may be used by a student to select a lesson to take in step 1312. Step 1312 is followed by step 1314, in which the StarRunner application 54 receives a "run lesson" command from the student.

Figure 32:
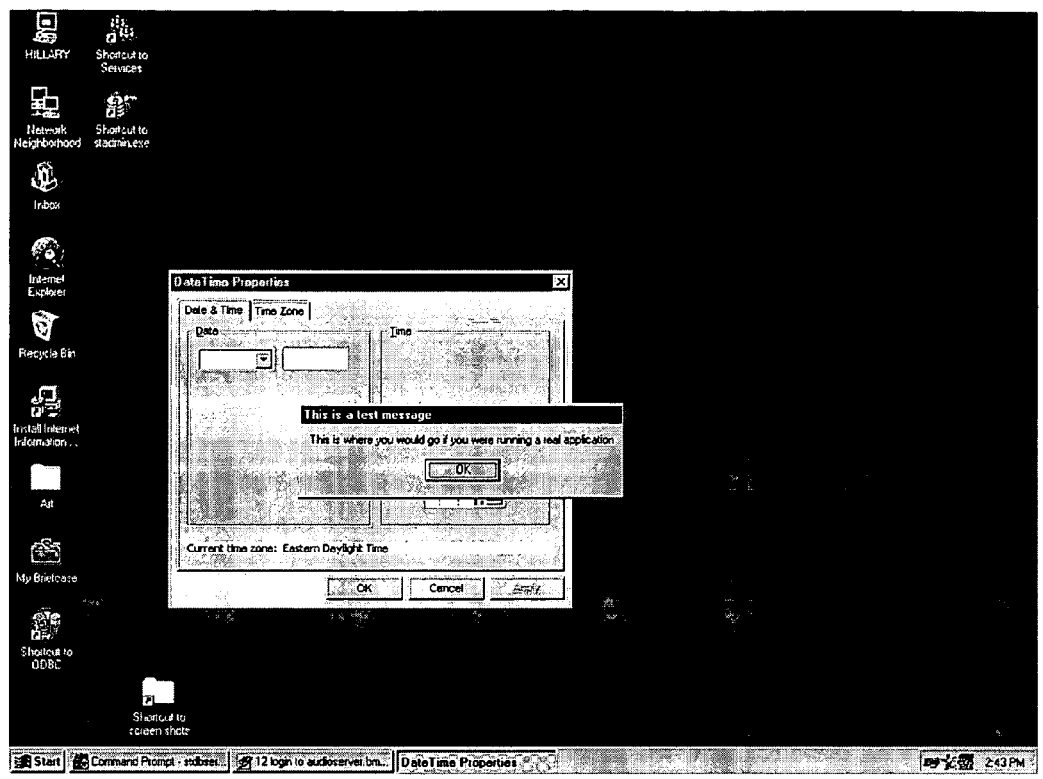
FIG. 32 is an illustration of a CBT system user interface running a lesson.

Step 1314 is followed by routine 1316, in which the audio server port connected to the student's telephone extension 40a becomes synchronized with the student's workstation 20. Routine 1316 is described in greater detail with reference to FIG. 14. Routine 1316 is followed by routine 1318, in which the StarRunner application 54 runs the selected lesson on the student's telephone extension 40a and the student's workstation 20. FIG. 32 is an illustration of a CBT system user that may used during routine 1318 to display the lesson pages. Routine 1318 is described in greater detail with reference to FIG. 15. Routine 1318 is followed by the "RETURN" step, which returns to step 606 shown on FIG. 6.

Figure 14:
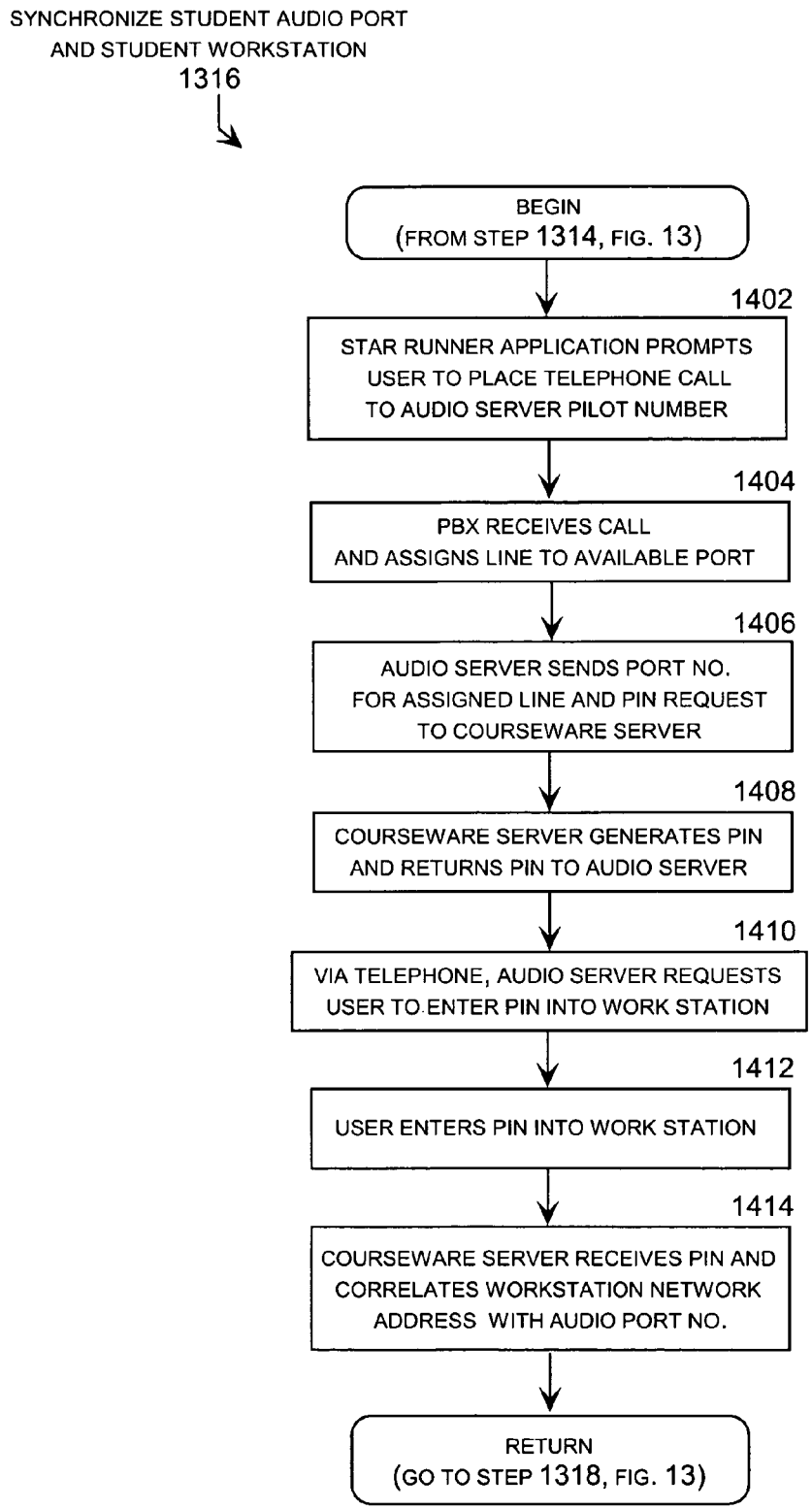
FIG. 14 is a logic flow diagram illustrating a routine for synchronizing servers in a CBT system.
Figure 33:
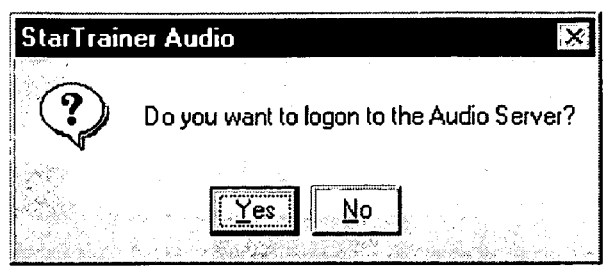
FIG. 33 is an illustration of a CBT system user interface for logging onto an audio server.

FIG. 14 is a logic flow diagram illustrating routine 1316 for synchronizing an audio port with an associates student workstation. Routine 1316 follows step 1314 shown on FIG. 13. In step 1402, a local instance of the StarRunner application 54 running on a student workstation 20 prompts the student to place a telephone call to the pilot number for the hunt group 36. FIG. 33 is an illustration of a CBT system user interface for logging onto the audio server in step 1402. The screen display may give this number to the student, or the student may be expected to know this number from a previous orientation session. In either case, the student then dials the pilot number on the telephone extension 40b. Step 1402 is followed by step 1404, in which the PBX 14 receives the telephone call and connects the student's telephone extension 40b with the a particular audio port 71 of the DIALOGIC card 32 audio server by finding an available line 73 of the telephone trunk 34 within the hunt group 36 and connecting that line with the incoming telephone line 38b from the student's telephone extension. The audio server 16 then receives the telephone call on that particular audio port having the assigned port number 71; namely, the port connected to the telephone line 73 selected by the PBX 14 to connect the audio server 16 with the student's telephone extension 40b.

Step 1404 is followed by step 1406, the audio server 16 contacts courseware server 18 and delivers a message 80 to the courseware server. This message, which includes the audio port number 71 for the subject training session, requests the courseware server 18 to issue an identification or PIN 82 for the training session. Step 1406 is followed by step 1408, in which the courseware server 18 either randomly generates or looks up an available PIN 82 from a predefined memory location, and delivers the PIN to the audio server 16. The courseware server 18 also stores the PIN 82 and the audio port number 71 for the training session in a table for later use. Step 1408 is followed by step 1410, in which the audio server 16 employs pre-recorded audio files to play the PIN 82 on the student's telephone extension 40b along with a recording asking the student to enter the PIN into a predefined edit field within a dialog box displayed on the student's workstation 20.

Step 1410 is followed by step 1412, in which the student enters the PIN 82 into the dialog box along with an "OK" command, which delivers the PIN to the courseware server 18. Step 1412 is followed by step 1414, in which the courseware server 18 uses the PIN to correlate the network address for the student's workstation 20 with the audio port 71 in the audio server 16 that is connected to the student's telephone extension 40b. Specifically, the courseware server 16 enters the network address for the student's workstation 20 into the reference table, completing a record for the training session that includes the PIN 82, the audio server port number 71 for the training session, and the network address for the student's workstation 20. During the course of the training session, the courseware server references this record to route audio files for the training session to the correct audio server port 71, which causes the audio server to play these audio files on student's telephone extension phone 40b. Step 1414 is followed by the "RETURN" step, which returns to step 1318 shown on FIG. 13.

Figure 15:
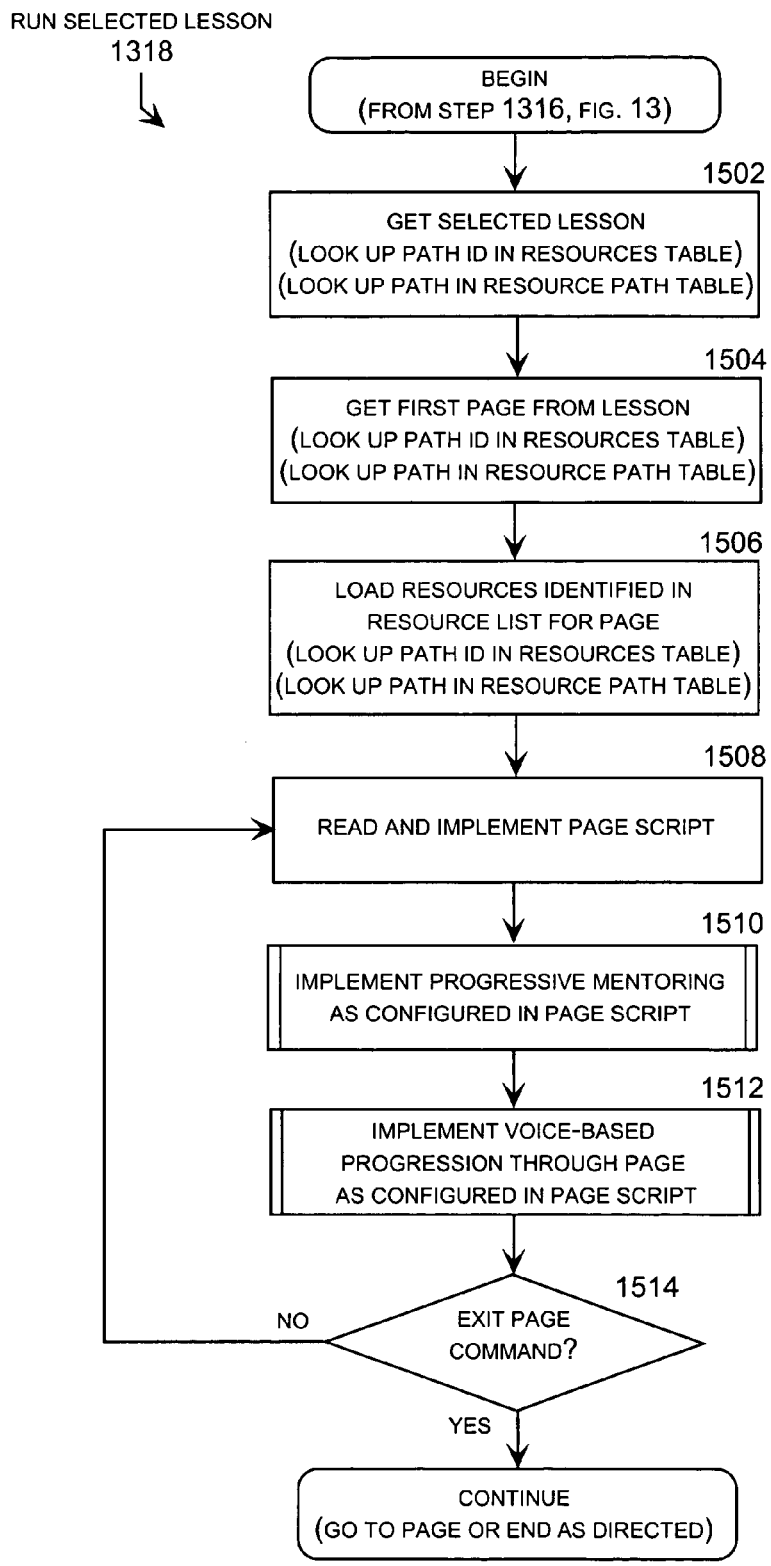
FIG. 15 is a logic flow diagram illustrating a routine for running a selected lesson in a CBT system.

FIG. 15 is a logic flow diagram illustrating routine 1318 for running a selected lesson. Routine 1318 follows routine 1316 shown on FIG. 13. In step 1502, the local instance of the StarRunner application 54 gets the selected lesson. This lesson was selected by the student from a list obtained by looking up the student's available lessons in the Resource Assignments table 100. This look up provides the StarRunner application 54 with the resource name for each lesson presented to the student for selection. The StarRunner application 54 then receives the resource name for the lesson from the student's selection command, and gives the name of the lesson to the Courseware Server 62, which uses the lesson name to look up the resource path ID for the lesson in the Resources table 94. The Courseware Server 62 then uses the resource path ID to look up the path name for the lesson in the Resource Paths table 96. The StarRunner application 54 then appends the lesson name to the lesson path name to obtain the root path for retrieving the selected lesson from memory.

Step 1502 is followed by step 1504, in which the StarRunner application 54 gets the first page for the lesson. Recall that the lesson does not store any resource or lesson logic data, but merely contains a list of pages for the lesson. For this reason, the StarRunner application 54 retrieves the first page in the lesson list to begin the lesson. This process is virtually the same as the previously-described process for retrieving the lesson. Specifically, the Courseware Server 62 obtains the resource name for the page from the lesson, and uses the page name to look up the resource path ID for the page in the Resources table 94. The Courseware Server 62 then uses the page path ID to look up the path name for the page in the Resource Paths table 96. The Courseware Server 62 then appends the page name to the page path name to obtain the root path for retrieving the page from memory.

Step 1504 is followed by step 1506, in which the StarRunner application 54 loads the resources for the current page into a local or cache memory, such as the system RAM. This activity, sometimes referred to as "caching," moves the resource data from a slower-retrieval storage location, such as a hard drive or CD ROM, into a faster-retrieval storage location, such as the system RAM. This minimizes any delay that might otherwise occur when the resource data is subsequently to be played or displayed in the course of running the logic. Again, the process for retrieving each resource file is virtually the same as the previously-described process for retrieving the lesson and the page. Specifically, the Courseware Server 62 obtains the resource name for the resource from the page, and uses the resource name to look up the resource path ID in the Resources table 94. The Courseware Server 62 then uses the resource path ID to look up the resource name in the Resource Paths table 96. The Courseware Server 62 then appends the resource name to the resource path name to obtain the root path for retrieving the resource from memory.

Step 1506 is followed by step 1508, in which the StarRunner application 54 implements the script logic for the page. This script logic may implement any number of logic paths, some or all of which may each exit the page in a different way. Generally, there are four script commands for exiting a page, "skip to next page," "skip to previous page," "skip to page [name], and "quit lesson." These commands, along with the other global or page-level commands, are included in the task table shown on FIG. 34. The "skip to next page" command instructs the StarRunner application 54 to load and execute the next page in the lesson list of pages. The "skip to previous page" command instructs the StarRunner application 54 to load and execute the previous page in the lesson list of pages. The "skip to page [name]" command instructs the StarRunner application 54 to load and execute the named page. And the "quit lesson" command instructs the StarRunner application 54 to end the lesson.

It should be appreciated, therefore, that the list of pages in an associated lesson is not the only logic path through the logic, but instead provides a complete list of all pages that may be called during the lesson. This makes the lesson page list useful for identifying resource dependencies, but is does not serve a static definition of the lesson logic. That is, the page list included in the lesson does not necessarily determine the path through any particular instance of the lesson. Rather, the logic implemented within the individual pages may enable any number of different logic paths through any given lesson. This is an attribute, but not an essential element, of the "virtual resource" configuration, in which each page is not only separately stored and independently retrievable for use in multiple lessons, but the page may also implement its own logic paths.

Step 1508 is followed by step 1510, in which the StarRunner application 54 implements a progressive mentoring lesson. This is an optional step, which is included for the purpose of illustrating the run-time methodology of a progressive mentoring lesson. The authoring logic for the progressive mentoring lesson was described previously with reference to FIG. 7, and the run-time logic is described in greater detail with reference to FIG. 16. Routine 1510 is followed by routine 1512, in which the StarRunner application 54 implements voice-based progression through a lesson. This is also an optional step, which is included for the purpose of illustrating the voice-based progression methodology, which is described in greater detail with reference to FIG. 17.

Routine 1512 is followed by step 1514, in which the StarRunner application 54 determines whether an "exit page" script command has been received. As noted previously, in the illustrated embodiment an "exit page" command may be a "skip to next page," "skip to previous page," "skip to page [name], or "quit lesson" command. If an "exit page" script command has not been received, the "NO" loops back to step 1508, in which the StarRunner application 54 reads and implements the next script command for the current page. If an "exit page" script command has been received, the "YES" branch is followed to the "CONTINUE" step, which returns the StarRunner application 54 implements the "exit page" command by going to the specified page or quitting the lesson.

Figure 16:
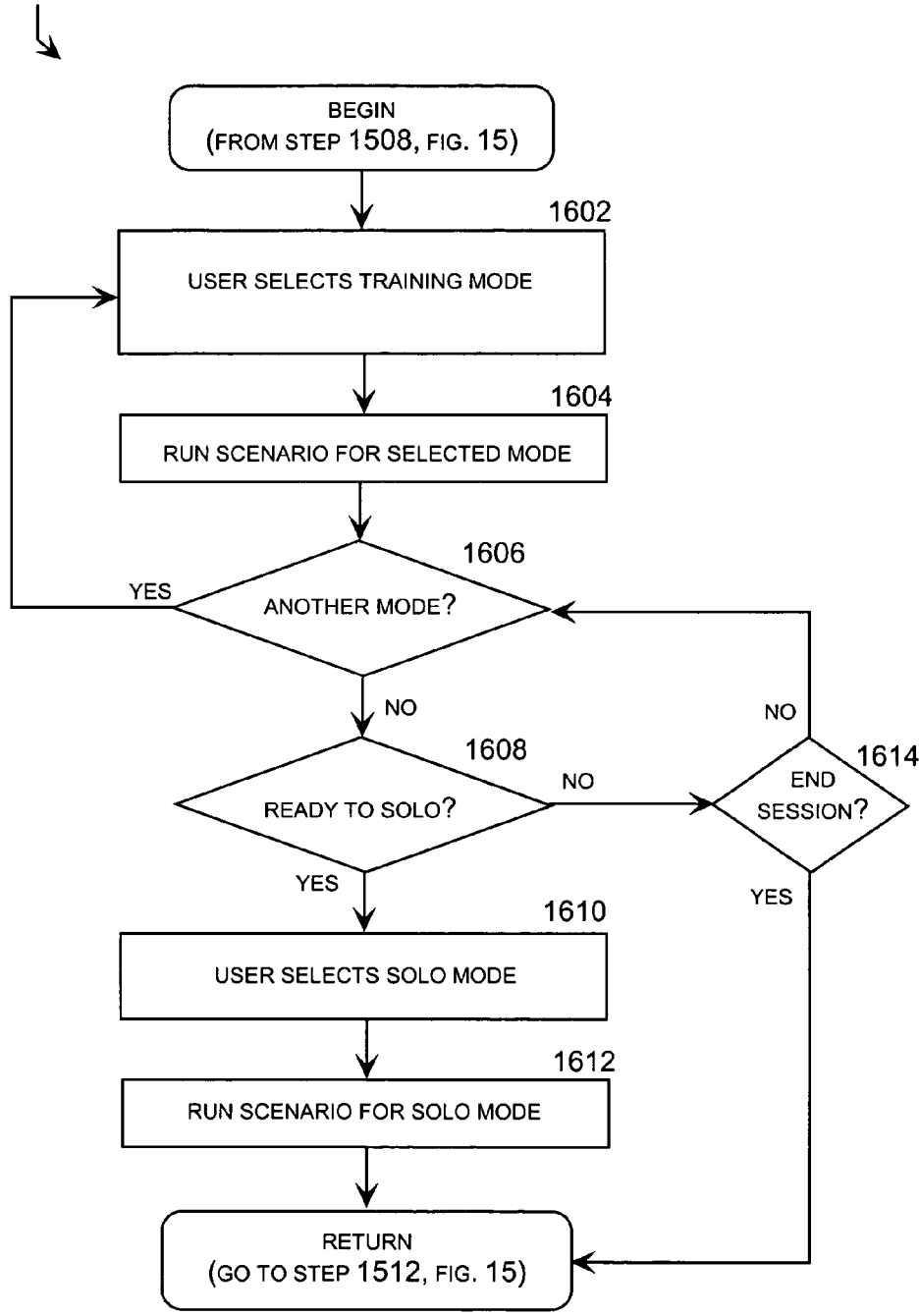
FIG. 16 is a logic flow diagram illustrating a routine for running a progressive mentoring lesson in a CBT system.

FIG. 16 is a logic flow diagram illustrating routine 1510 for running a progressive mentoring lesson. Routine 1510 follows step 1508 shown on FIG. 15. Recall that in a progressive mentoring training lesson, the lesson is divided into a plurality of skill-related task types, such as typing and speaking. Each task type is configured to selectively run in a demonstration mode in which user responses are not required to prompts relating to that task type, or in a training mode in which user responses are required to prompts relating to that task type. This allows the user to observe the lesson with all types of tasks in the demonstration mode, and then to practice the lesson with one type of task in the training mode while the other task is in the demonstration mode. Once the student becomes confident at these levels of mentoring, the student can "go solo" with all types of types of tasks operating in the training mode. The user can select the "observation mode" with all types of types of tasks operating in the demonstration mode as the first scenario. Step 1604 is followed by step 1606, in which the student elects whether to run the lesson in another mode or scenario. Typically, the student reruns the lesson to practice each skill in the training mode separately. To facilitate skill-by-skill training, the progressive mentoring lesson may include scenarios for practicing each lesson skills independently and in combination with one or more other skills. If the student elects to run the lesson in another mode, the "YES" loops back to step 1602, in which the StarRunner application 54 runs the selected lesson scenario. If the student does not elect to run the lesson in another mode, the "NO" branch is followed to step 1608, in which the student may elect to "go solo" with all types of types of tasks operating in the training mode.

If the student elects to run the lesson in the "solo" mode, the "YES" is followed to step 1610, in which the user selects the "solo" mode command. Step 1610 is followed by step 1612, in which the StarRunner application 54 runs the selected lesson in the "solo" mode. For some applications, the "solo" mode may be scored as a certification test. In addition, the student's voice and keyboard/mouse activities during the "solo" made may be recorded in a recorded audio file, a review file, and/or a response file for subsequent evaluation. Step 1612 is followed by the "RETURN" step, which returns to step 1512 shown on FIG. 15.

If the student does not feel ready to "go solo," the "NO" branch is followed to step 1614, in which the student may elect to end the training session. If the student does not elect to end the training session, the "NO" branch loops back to step 1606, in which the student may elect to practice the lesson in one of the available training modes. If the student elects to end the training session, the "YES" branch is followed to the "RETURN" step, which returns to step 1512 shown on FIG. 15.

Figure 17:
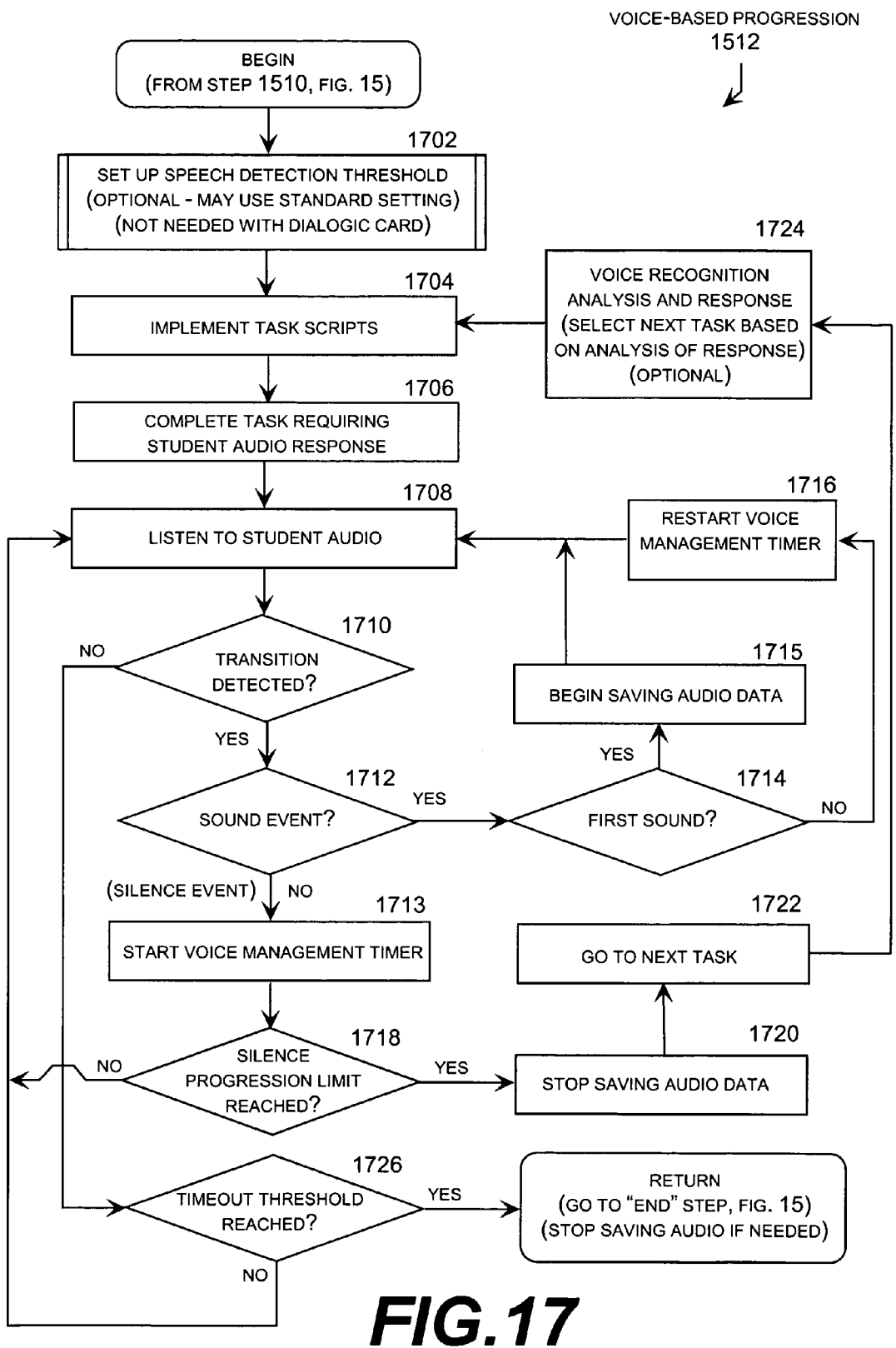
FIG. 17 is a logic flow diagram illustrating a routine for implementing voiced-based progression in a CBT system.

FIG. 17 is a logic flow diagram illustrating routine 1512 for implementing voiced-based progression. Routine 1512 follows routine 1510 shown on FIG. 15. In routine 1702, the audio server 16 may set up the speech detection thresholds prior to starting the training session. This step is optional when certain DIALOGIC cards 32 are use because these cards implement their own silence detection, and provide the audio server 16 with an audio transition signal (i.e., silence to non-silence, or vice versa). In addition, for applications using the student workstation-based sound cards and microphones, the speech detection thresholds may be pre-set to heuristically determined standard settings, and the student user may be expected to adjust the microphone gain on the workstation end to obtain the desires system response. Nevertheless, for some applications it may be advantageous to set the speech detection thresholds at the audio server 16 prior to starting the training session.

Routine 1702 is followed by step 1704, in which the StarRunner application 54 implements the task scripts defined by the current page. Step 1704 is followed by step 1706, in which the StarRunner application 54 complete a task, such as a voice prompt, requiring a verbal or other type of audio student response. Step 1706 is followed by step 1708, in which the StarRunner application 54 listens to the student audio, typically over the telephone 40*b* or over the student workstation-based microphone. Step 1708 is followed by step 1710, in which the StarRunner application 54 detects an audio transition. As noted previously, the StarRunner application 54 may make this transition detection itself, or it may receive an audio transition signal from the DIALOGIC card 32.

If an audio transition is detected, the "YES" branch is followed to step 1712, in which the StarRunner application 54 determines whether the transition is a sound event (i.e., silence to sound transition, rather than a sound to silence transition). if the transition is a not sound event, then it is a silence event (i.e., sound to silence transition), and the "NO" branch is followed to step 1713, in which the StarRunner application 54 starts the voice management timer. This timer is used to time the predetermined period of silence following the student's response required to progress the lesson. This predetermined period of time, which is typically set at two seconds, is referred to as the "silence progression limit." In addition, the silence progression limit may be an adjustable parameter that may be changed through a menu setting or other type of configuration parameter.

Referring again to step 1712, if the transition is a sound event, the "YES" branch is followed to step 1714, in which the StarRunner application 54 determines whether the transition is the first sound event received since the voice prompt was communicated on step 1706. If the transition is the first sound event received since the voice prompt was communicated on step 1706, the "YES" branch is followed to step 1715, in which the StarRunner application 54 begins saving the student audio data. If the transition is not the first sound event received since the voice prompt was communicated on step 1706, the "NO" branch is followed to step 1716, in which the StarRunner application 54 restarts the voice management timer. This timer is reset in step 1716 so that any initial noises received from the student, such as throat clearing, initial stammering, or paper rustling will restart the voice management timer. Following steps 1715 and 1716, routine 1512 loops back to step 1708, in which the StarRunner application 54 continues to listen to the student audio.

Referring again to step 1713, this step is followed by step 1718, in which the StarRunner application 54 determines whether the voice management timer has reached the silence progression limit. If the voice management timer has reached the silence progression limit, the "YES" branch is followed to step 1720, in which the StarRunner application 54 stops saving the student-generated audio data. Step 1720 is followed by step 1722, in which the StarRunner application 54 implements the next task in the page script. That is, the StarRunner application 54 progresses the lesson in response to detecting a period of silence lasting the silence progression limit following the detection of a sound event.

Step 1722 is followed by step 1724, in which the StarRunner application 54 may implement voice recognition analysis and response. That is, the StarRunner application 54 may optionally be configured to recognize and interpret the student's audio response in real time, and select the next task based on this analysis. For example, if the student's response is interpreted to be correct, the StarRunner application 54 may progress the lesson to the next task and increment the lesson score. Alternatively, if the student's response is interpreted to be incorrect, the StarRunner application 54 may respond accordingly, for example by prompting the user to try again, correcting the student and progress the lesson, decreasing the lesson score, or the like. It will be appreciated that a wide variety of lesson logic paths may be programmed into the lesson logic to take advantage of the voice recognition and interpretation capability. Following step 1724, routine 1512 loops back to step 1704, in which the StarRunner application 54 implements another task script.

Referring again to step 1718, if the voice management timer has not reached the silence progression limit, the "NO" branch loops back to step 1720, in which the StarRunner application 54 continues to listen to the student audio. In other words, the StarRunner application 54 continues to listen to the student audio until it detects another sound transition in step 1710, or until it voice management timer reaches the silence progression limit in step 1718.

Referring again to step 1710, if the StarRunner does not detect a sound transition, the "NO" branch loops down to step 1726, in which the StarRunner application 54 determines whether a timeout threshold has been reached. This timeout threshold is used to discontinue the lesson if the student fails to provide an audio response in response to an audio prompt for a predetermined period of time, such as thirty seconds. This prevents the CBT system 10 from filling its memory resources with long periods of recorded silence. If the timeout threshold has not been reached, the "NO" branch loops back to step 1708, in which the StarRunner application 54 continues to listen to the student audio. In other words, the StarRunner application 54 continues to listen to the student audio until it detects another sound transition in step 1710, or until the timeout threshold has been reached in step 1726. Step 1726 is followed by the "RETURN" step, in which the CBT system 10 stops recording student audio data, if necessary, and then returns to the "END" step shown on FIG. 15.

Figure 18:
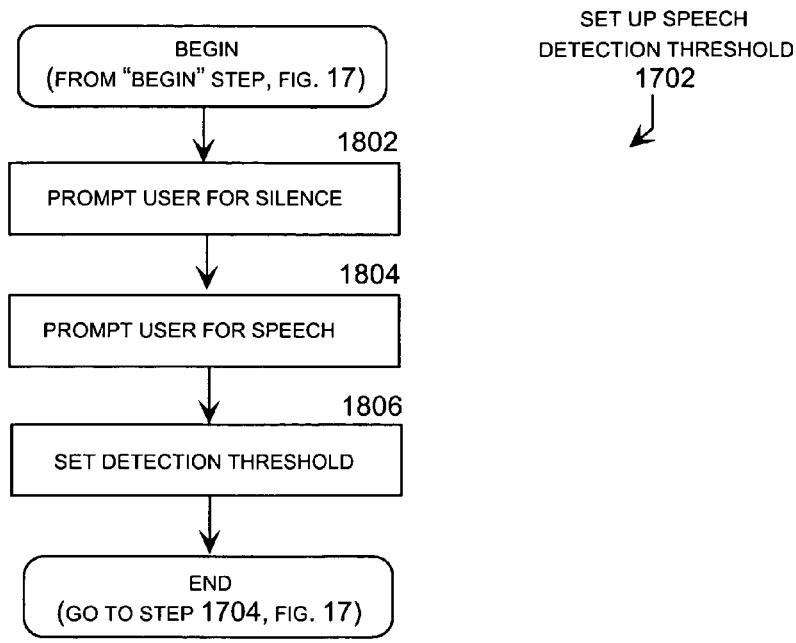
FIG. 18 is a logic flow diagram illustrating a routine for setting up a speech detection threshold for voiced-based progression in a CBT system.
Figure 19:
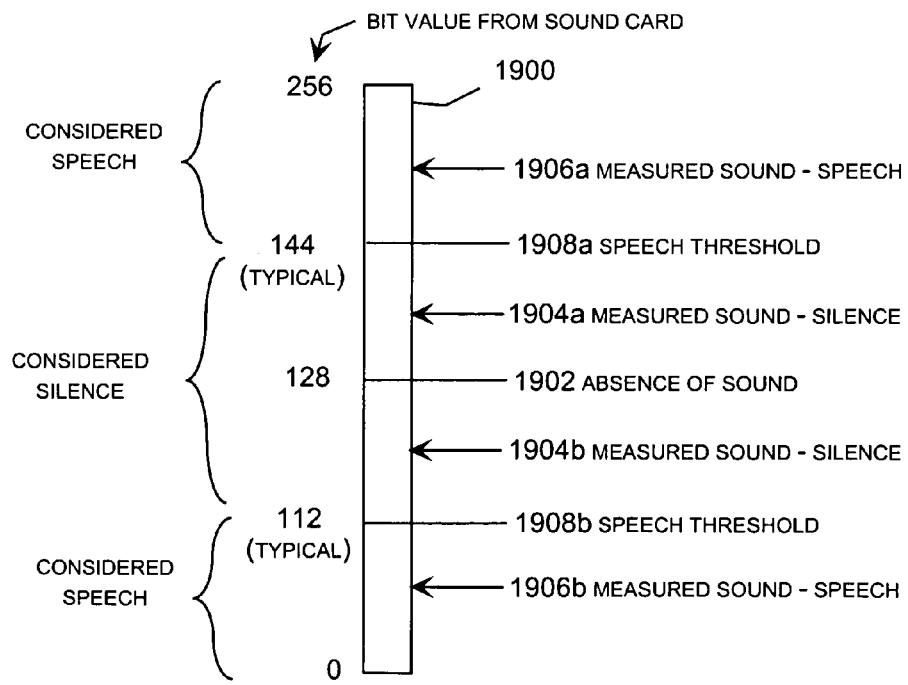
FIG. 19 is a diagram illustrating a speech detection threshold for voiced-based progression in a CBT system.

FIG. 18 is a logic flow diagram illustrating routine 1702 for setting up a speech detection threshold for voiced-based progression. FIG. 18 will be described in connection with FIG. 19, which is a diagram illustrating the speech detection threshold. FIG. 19 includes a vertical register 1900 with 256 bins, which represents an 8-bit sound value received from a PC sound card or another audio source. In this illustration, the bit value zero is on the bottom of the register 1900, and the bit value 265 is on the top. Of course, this register 1900 could include 64,256 bins to represent a 16-bit sound value, or any other number of bins that may be appropriate for a particular sound signal. The center 128 bit value 1902 represents the absence of sound, and the register levels above and below this center bit value 1902 represent sound, with the level of the sound increasing as the bit values get further away from the center 128 bit value 1902.

Routine 1512 follows routine 1510 shown on FIG. 15. In step 1802, in which the audio server 16 prompts the student user for a period of silence. This allows the audio server 16 to measure the background noise received by the microphone or telephone handset or headset at the student's location. This measured background sound level is represented on FIG. 19 as the "measured sound—silence" levels 1904*a–b*. Step 1802 is followed by step 1804, in which the audio server 16 prompts the student to speak at a normal volume. This measured speech sound level is represented on FIG. 19 as the "measured sound—speech" levels 1906*a–b*. Step 1804 is followed by step 1806, in which the audio server 16 sets the speech detection threshold levels 1908*a–b* based on the measured speech levels. For example, the audio server may set the speech detection threshold levels 1908*a–b* half way between the "measured sound—silence" levels 1904*a–b* and the "measured sound—speech" levels 1906*a–b*. Step 1806 is followed by the "RETURN" step, which returns to step 1704 shown on FIG. 15.

Referring to FIG. 19, typical speech detection threshold levels 1908*a–b* are shown as bit values 144 and 112, which correspond to 16 bits above an below the center 128-bit level 1902. These speech detection threshold levels 1908*a–b* have heuristically been found to produce acceptable results in most instances. Thus, these speech detection threshold levels 1908*a–b* are preferred as the standard settings. In addition, routine 1702 may be altered such that only the background noise levels 1904*a–b* are measured. In this case, the speech detection threshold levels 1908*a–b* may be set a predetermined number distance from the background noise levels 1904a–b, such as twice the background noise levels 1904a–b or 8 bits away from the background noise levels 1904a–b.

FIG. 20 is an illustration of a CBT system user interface for selecting a review file for evaluating a lesson result. This user interface may be used to select a completed lesson to review in step 608 shown on FIG. 6A.

FIG. 21 is an illustration of a CBT system user interface for creating a new lesson author. This user interface may be used to create an author in step 614 shown on FIG. 6B.

FIG. 22 is an illustration of a CBT system user interface for creating a new lesson. This user interface may be used to create a new lesson to review in step 618 shown on FIG. 6B.

FIG. 23 is an illustration of a CBT system user interface for setting lesson properties. This user interface may be used to establish lesson properties in step 802 shown on FIG. 8.

FIG. 24 is an illustration of a CBT system user interface for creating a task list for a control. This user interface may be used to create a task list for a control in step 812 shown on FIG. 8.

FIG. 25 is an illustration of a CBT system user interface for inserting audio files into a lesson. This user interface may be used to link a page to an audio file in step 908 shown on FIG. 9.

FIG. 26 is an illustration of a CBT system user interface for selecting an application screen to capture into a lesson. This user interface may be used to select an application screen to capture in step 1008 shown on FIG. 10.

FIG. 27 is an illustration of a CBT system user interface including an application screen captured into a lesson. This user interface illustrates an imported application screen in step 1016 shown on FIG. 10.

FIG. 28 is an illustration of a CBT system user interface for creating a new student. This user interface may be used to add a new student in step 1206 shown on FIG. 12.

FIG. 29 is an illustration of a CBT system user interface for assigning a lesson to a student. This user interface may be used to assign lessons to students in step 1210 shown on FIG. 10.

FIG. 30 is an illustration of a CBT system user interface for student login. This user interface may be used to log into the CBT system in step 1306 shown on FIG. 13.

FIG. 31 is an illustration of a CBT system user interface for viewing lessons assigned to a student. This user interface may be used by a student to select a lesson to take in step 1312 shown on FIG. 13.

FIG. 32 is an illustration of a CBT system user interface running a lesson. This user interface may be used in step 1318 shown on FIG. 13.

FIG. 33 is an illustration of a CBT system user interface for logging onto the audio server in step 1402 shown on FIG. 14.

FIGS. 34–38 include tables illustrating controls, tasks, and task events that may be used to author lessons. These tables list and describe the authoring tools described with reference to FIGS. 8, 9 and 10.

In view of the foregoing, it will be appreciated that the versatile resources of the present invention reduce the memory storage requirements for a CBT system capable of supporting multiple training scenarios in a multi-user network environment. This CBT system realistically simulates multi-mode communication systems, implements progressive mentoring and voice-based progression methodologies, and achieves other advancements and improvements in the art of computer-based training. It should be understood that the foregoing relates only to the exemplary embodiments of the present invention, and that numerous changes may be made therein without departing from the spirit and scope of the invention as defined by the following claims.

The invention claimed is:

1. A computer-based training system comprising:
   a computer network defining a plurality of network ports;
   a lesson server functionally connected to the network, the lesson server storing a plurality of lessons, each lesson comprising a synchronized set of audio and interactive graphical display resources;
   a plurality of student workstations functionally connected to respective network ports, each student workstation configured to display the graphical display resources of a selected lesson and to receive interactive student responses to these resources;
   an audio server functionally connected to the network and comprising a plurality of audio ports, each audio port operative for connecting at least one telephone line to the audio server, the audio server configured to play the audio resources of the selected lesson via a selected audio port in synchronism with the display the associated graphical display resources;
   a plurality of telephone extensions, each associated with and located near a student workstation to allow the student workstation and the associated telephone extension to be accessed simultaneously by a student user;
   a private branch exchange functionally connected to the audio ports of the audio server by way of a trunk of telephone lines, the private branch exchange configured to selectively connect available lines of the trunk to lines connected to the telephone extensions to connect the telephone extensions to the audio server;
   upon receipt of a telephone call at the audio server from a telephone extension operated by a student user, the audio server operative to deliver an audible identification number to the student user via the telephone extension; and
   upon entry of the identification into the student workstation, the computer-based training system operative to use the identification number to associate the network port assigned to the student workstation with the audio port connected to
   the associated telephone extension for the purpose of correlating the student workstation with the associated telephone extension.

2. The computer-based training system of claim 1, further configured to compute and store a score based on the interactive student responses received during a lesson.

3. The computer-based training system of claim 2, wherein:
   a user provides responses to prompts played or displayed as part of a lesson that is divided into a plurality of task types, each task type comprising similar tasks relating to a common skill; and
   each task type is configured to selectively run in a demonstration mode in which user responses are not required to prompts relating to that task type, or in a training mode in which user responses are required to prompts relating to that task type.

4. The computer-based training system of claim 3, further configured to record the student responses during a lesson and to subsequently play back the student responses in connection with the lesson for evaluation purposes.

5. The computer-based training system of claim 4, wherein a user provides audible responses to prompts played or displayed as part of a lesson, and the lesson logic progresses in response to detection of an audible response and a predetermined period of silence following the audible response.

6. The computer-based training system of claim 1, wherein:
the audio server is operative to receive interactive audible student responses to the audible resources; and
the computer-based training system is configured to progress the lesson in response to detection of an audible response and a predetermined period of silence following the audible response.

7. A computer-readable medium having computer-executable instructions defining:
an authoring program module accessible by a lesson designer to create a plurality of lessons, wherein the authoring program module has computer-executable instructions for
interrogating a target screen object to identify a screen object control that is not supported by the authoring program module;
extracting a screen object bit map from the target screen object corresponding to visual aspects of the target screen object that do not correspond to screen object controls that are supported by the authoring program module;
storing the extracted screen object bit map as an indexed resource for later retrieval; and
creating a script instruction within the lesson for associating a function with the screen object bit map;
each lesson including one or more links to versatile resources for display or play in association with the lesson;
each resource stored in memory and independently retrievable for display or play with multiple lessons;
one or more runner program modules accessible by lesson takers for running the lessons; and
a relational database accessible by the runner program modules and containing information for retrieving desired resources for display or play in association with the lessons.

8. The computer-readable medium of claim 7, wherein:
each lesson comprises a plurality pages; and
each page comprises one or more controls defining visual and functional aspects of the page, links to resources, and script instructions defining lesson logic for implementing the page.

9. The computer-readable medium of claim 8, wherein the authoring program module comprises a plurality of menu-driven commands that the lesson designer selectively activates to create the pages, add the controls to the pages, link the pages to the resources, and create the script instructions for rendering pages and implementing lesson logic.

10. The computer-readable medium of claim 7, wherein one or more of the resources are selected from the group comprising a sound file, a video file, and a bit map file.

11. The computer-readable medium of claim 7, wherein the first communication mode comprises a computer and the second communication mode comprises a telephone.

12. The computer-readable medium of claim 7, wherein:
the runner program module resides in a shared folder maintained on a network server;
multiple instances of the runner program module download from the network server to the student workstations upon command;
each downloaded instance of the runner program module runs within a memory space maintained on an associated one of the student workstations during a session;
each downloaded instance of the runner program module deletes from the memory space maintained on the associated student workstation upon completion of the session; and
the shared folder functionality is a generally available operating system feature that allows each student workstation to download its associated instance of the runner program module without having software specific to the runner program module previously installed on the runner workstation.

13. The computer-readable medium of claim 12, wherein each session operates independently of the other sessions.

14. The computer-readable medium of claim 7, wherein a user provides responses to prompts played or displayed as part of a lesson, and an evaluation score is computed based on the user's responses.

15. The computer-readable medium of claim 7, wherein a user provides responses to prompts played or displayed as part of a lesson, and the lesson and associated user responses are stored for subsequent playback and evaluation.

16. The computer-readable medium of claim 7, wherein a user provides audible responses to prompts played or displayed as part of a lesson, and the lesson logic progresses in response to detection of an audible response and a predetermined period of silence following the audible response.

17. The computer-readable medium of claim 7, wherein:
a user provides responses to prompts played or displayed as part of a lesson that is divided into a plurality of task types, each task type comprising similar tasks relating to a common skill; and
each task type is configured to selectively run in a demonstration mode in which user responses are not required to prompts relating to that task type, or in a training mode in which user responses are required to prompts relating to that task type.

18. The computer-readable medium of claim 7, wherein:
each resource is assigned a resource name;
the resources are subdivided into a plurality of resource types, each resource type comprising one or more similar resources;
each resource type is assigned a resource type name;
the resource name and resource type name assigned to a particular resource defines a root path for retrieving that resource from memory; and
the resource name and resource type name for each resource may be retrieved from the relational database and appended together to create the root path for retrieving that resource from memory.

19. A computer-based training system comprising:
a lesson server comprising a plurality of lessons, each lesson comprising synchronized audio and visual resources;
an authoring program module coupled to the lesson server and operative to:
interrogate a target screen object to identify a screen object control that is not supported by the authoring program module;
extract a screen object bit map from the target screen object corresponding to visual aspects of the target screen object that do not correspond to screen object controls that are supported by the authoring program module;
store the extracted screen object bit map as an indexed resource for later retrieval; and
create a script instruction within the lesson for associating a function with the screen object bit map;

an audio server coupled to the lesson server and operable for playing the audio resource;

a computing device coupled to the lesson server, the computing device operable for receiving at least one of the plurality of lessons and displaying the visual resource; and a telephone coupled to the audio server and located proximate to the computing device, the telephone operable for receiving the audio resource being played by the audio server.

20. The computer-based training system of claim 19, further comprising a runner program module operable for recording a response during one of the lessons and subsequently playing back the response in connection with the lesson for evaluation purposes.

21. The computer-based training system of claim 20, wherein the runner program module is further operable to compute and store a score based on the response received during the lesson.

22. The computer-based training system of claim 20, wherein the response comprises an audio response.

23. The computer-based training system of claim 20, wherein the runner program module is further operable for advancing the lesson upon receiving the response.

24. A computer-implemented method for providing training comprising:

using an authoring program module to create a lesson comprising a visual resource and an audio resource, the visual resource comprising controls, wherein the authoring program module is operative to:

interrogate a target screen object to identify a screen object control that is not supported by the authoring program module;

extract a screen object bit map from the target screen object corresponding to visual aspects of the target screen object that do not correspond to screen object controls that are supported by the authoring program module;

store the extracted screen object bit map as an indexed resource for later retrieval; and create a script instruction within the lesson for associating a function with the screen object bit map;

receiving a request for the lesson from a client computing device;

transmitting the lesson to the client computing device such that the visual resource is synchronized with the audio resource; and receiving a response to the lesson from the client computing device.

25. The computer-implemented method of claim 24, further comprising the step of recording the response to the lesson for creating an evaluation of the response.

26. The computer-implemented method of claim 24, further comprising the steps of:

interrogating a target screen object to identify a screen object control that is supported by the authoring program module; and rendering the screen object control within a page of the lesson to recreate the screen object control.

27. The computer-implemented method of claim 24, further comprising the step of evaluating the response and using the evaluation to select a new lesson.

28. The computer-implemented method of claim 24, further comprising the step of, in response to receiving the response to the lesson, transmitting a new video resource and a new audio resource.

29. A computer-readable medium having computer-executable instructions for performing the steps using an authoring program module to create a lesson comprising a visual resource and an audio resource, the visual resource comprising controls, wherein the authoring program module is operative to:

interrogate a target screen object to identify a screen object control that is not supported by the authoring program module;

extract a screen object bit map from the target screen object corresponding to visual aspects of the target screen object that do not correspond to screen object controls that are supported by the authoring program module;

store the extracted screen object bit map as an indexed resource for later retrieval; and create a script instruction within the lesson for associating a function with the screen object bit map;

receiving a request for the lesson from a client computing device;

transmitting the lesson to the client computing device such that the visual resource is synchronized with the audio resource; and receiving a response to the lesson from the client computing device.

* * * * *